(12) United States Patent
Kuhara

(10) Patent No.: US 10,694,910 B2
(45) Date of Patent: Jun. 30, 2020

(54) CONTROL METHOD OF AUTONOMOUS CLEANER, CONTROL DEVICE, NON-TRANSITORY COMPUTER-READABLE RECORDING MEDIUM STORING A CONTROL PROGRAM, AND AUTONOMOUS CLEANER

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 213 days.

(21) Appl. No.: 15/897,233

(22) Filed: Feb. 15, 2018

(65) Prior Publication Data
US 2018/0249874 A1 Sep. 6, 2018

(30) Foreign Application Priority Data
Mar. 1, 2017 (JP) .................................. 2017-038426

(51) Int. Cl.
*A47L 9/28* (2006.01)
*A47L 5/22* (2006.01)
(Continued)

(52) U.S. Cl.
CPC .............. *A47L 9/2852* (2013.01); *A47L 5/22* (2013.01); *A47L 9/0488* (2013.01);
(Continued)

(58) Field of Classification Search
CPC ........ A47L 9/2852; A47L 5/22; A47L 9/0488; A47L 9/2805; A47L 9/2857;
(Continued)

(56) References Cited

U.S. PATENT DOCUMENTS

| 8,364,309 B1 * | 1/2013 | Bailey | G06N 3/008 700/245 |
| 2005/0171644 A1 * | 8/2005 | Tani | A47L 9/009 700/253 |

(Continued)

FOREIGN PATENT DOCUMENTS

JP 2007-034561 2/2007

*Primary Examiner* — Yazan A Soofi
(74) *Attorney, Agent, or Firm* — Greenblum & Bernstein, P.L.C.

(57) ABSTRACT

A management device that controls an autonomous cleaner includes a processing circuitry that obtains an electronic floor plan of a predetermined space, the predetermined space being a cleaning range of the autonomous cleaner. The management device estimates a person-present position at which a person is present in the predetermined space, and divides the predetermined space into a plurality of cleaning target areas to be individually cleaned by the autonomous cleaner. The management device further identifies a cleaning target area including the person-present position where the person is estimated to be present, as a person-present cleaning target area. The management device further identifies a cleaning target area around the person-present cleaning target area as a surrounding cleaning target area. The management device determines, among the multiple cleaning target areas, cleaning target areas other than the person-present cleaning target area and the surrounding cleaning target area to be cleanable areas.

16 Claims, 22 Drawing Sheets

(51) Int. Cl.
*A47L 9/04* (2006.01)
*G05D 1/02* (2020.01)

(52) U.S. Cl.
CPC ........... *A47L 9/2805* (2013.01); *A47L 9/2857* (2013.01); *G05D 1/0219* (2013.01); *G05D 1/0231* (2013.01); *G05D 1/0274* (2013.01); *A47L 2201/04* (2013.01); *G05D 2201/0203* (2013.01); *G05D 2201/0215* (2013.01)

(58) Field of Classification Search
CPC .............. A47L 2201/04; G05D 1/0219; G05D 1/0231; G05D 1/0274
USPC ........................................................... 701/25
See application file for complete search history.

(56) References Cited

U.S. PATENT DOCUMENTS

| | | | |
|---|---|---|---|
| 2005/0216122 A1* | 9/2005 | Tani ..................... | G05D 1/0274 700/245 |
| 2005/0288079 A1* | 12/2005 | Tani ........................ | A63F 9/001 463/1 |
| 2006/0111811 A1* | 5/2006 | Okamoto ................. | B25J 5/007 700/214 |
| 2009/0281661 A1* | 11/2009 | Dooley ................... | B60L 50/66 700/258 |
| 2011/0082668 A1* | 4/2011 | Escrig ................. | G05D 1/0246 703/1 |
| 2011/0202175 A1* | 8/2011 | Romanov ........... | A47L 11/4011 700/250 |
| 2011/0288684 A1* | 11/2011 | Farlow ................... | B25J 11/009 700/264 |
| 2014/0207282 A1* | 7/2014 | Angle ..................... | G05B 15/02 700/257 |
| 2017/0108860 A1* | 4/2017 | Doane ................. | G05D 1/0212 |
| 2017/0131721 A1* | 5/2017 | Kwak ..................... | B25J 9/1664 |
| 2017/0361468 A1* | 12/2017 | Cheuvront ........... | A47L 9/2857 |
| 2018/0120794 A1* | 5/2018 | Cheng .................... | B25J 9/0003 |
| 2018/0253671 A1* | 9/2018 | Kuhara ................. | A47L 9/2857 |
| 2018/0279847 A1* | 10/2018 | Park ...................... | G05D 1/0027 |
| 2018/0318458 A1* | 11/2018 | Rasmussen ............... | A61L 2/26 |
| 2018/0361583 A1* | 12/2018 | Williams ............... | B25J 9/1679 |
| 2019/0082102 A1* | 3/2019 | Tokuchi ............. | H04N 5/23222 |

* cited by examiner

FIG. 4

| CLEANING TARGET AREA | SURROUNDING CLEANING TARGET AREA |
|---|---|
| A1 | A2, A8, A9, A10 |
| A2 | A1, A3, A7, A9, A10, A11 |
| A3 | A2, A4, A7 |
| A4 | A3, A5, A7, A12, A16 |
| A5 | A4, A6, A16 |
| A6 | A5 |
| A7 | A2, A3, A4, A11, A12 |
| A8 | A1, A9, A13 |
| A9 | A1, A2, A8, A10, A13, A14 |
| A10 | A1, A2, A9, A11, A13, A14, A15 |
| A11 | A2, A7, A10, A12, A14, A15 |
| A12 | A4, A7, A11, A15, A16 |
| A13 | A8, A9, A10, A14 |
| A14 | A9, A10, A11, A13, A15 |
| A15 | A10, A11, A12, A14 |
| A16 | A4, A5, A12, A17 |
| A17 | A16 |

FIG. 6

| CLEANING TARGET AREA | SURROUNDING CLEANING TARGET AREA |
|---|---|
| A1 | A2, A9 |
| A2 | A1, A3, A7 |
| A3 | A2, A7 |
| A4 | A5 |
| A5 | A4, A6 |
| A6 | A5 |
| A7 | A2, A3, A10, A11, A12 |
| A8 | A1, A9, A13 |
| A9 | A1, A8, A10, A13, A14 |
| A10 | A2, A9, A11, A12, A13, A14 |
| A11 | A2, A7, A10, A12, A14, A15 |
| A12 | A7, A10, A11, A15 |
| A13 | A8, A9, A14 |
| A14 | A9, A10, A11, A13, A15 |
| A15 | A11, A12, A14 |
| A16 | A17 |
| A17 | A16 |

FIG. 14

| CLEANING TARGET AREA | SURROUNDING CLEANING TARGET AREA |
|---|---|
| A1 | A2, A8, A9, A10 |
| A2 | A1, A3, A7, A9, A10, A11 |
| A3 | A2, A4, A7 |
| A4 | A3, A5, A7, A12, A16 |
| A5 | A4, A6, A16 |
| A6 | A5 |
| A7 | A2, A3, A4, A10, A11, A12 |
| A8 | A1, A9, A13 |
| A9 | A1, A2, A8, A10, A13, A14 |
| A10 | A1, A2, A9, A11, A13, A14, A15 |
| A11 | A2, A7, A10, A12, A14, A15 |
| A12 | A4, A7, A11, A15, A16 |
| A13 | A8, A9, A10, A14 |
| A14 | A9, A10, A11, A13, A15 |
| A15 | A10, A11, A12, A14 |
| A16 | A4, A5, A12, A17 |
| A17 | A16 |

FIG. 15

| CLEANING TARGET AREA | SURROUNDING CLEANING TARGET AREA |
|---|---|
| A1 | A2, A8, A9 |
| A2 | A1, A3, A7, A10, A11 |
| A3 | A2, A4, A7 |
| A4 | A3, A5, A7, A16 |
| A5 | A4, A6 |
| A6 | A5 |
| A7 | A2, A3, A4, A12 |
| A8 | A1, A9, A13 |
| A9 | A1, A2, A8, A10, A13 |
| A10 | A2, A9, A11, A14 |
| A11 | A7, A10, A12, A15 |
| A12 | A7, A11, A15, A16 |
| A13 | A8, A9, A14 |
| A14 | A10, A13, A15 |
| A15 | A11, A12, A14 |
| A16 | A4, A12, A17 |
| A17 | A16 |

FIG. 20

| CLEANING TARGET AREA | SURROUNDING CLEANING TARGET AREA |
|---|---|
| A1 | A2, B1 |
| A2 | A1, A3, A7, B1 |
| A3 | A2, A7, B4 |
| A4 | A5, B3, B4 |
| A5 | A4, A6, B3 |
| A6 | A5, B3 |
| A7 | A2, A3, A11, A12, B1, B4 |
| A8 | A9, A13, B1 |
| A9 | A8, A13, B1, B2 |
| A10 | A11, A14, A15, B1, B2 |
| A11 | A7, A10, A12, A14, A15, B1 |
| A12 | A7, A11, A15, B4 |
| A13 | A8, A9, A14, B2 |
| A14 | A10, A11, A13, A15, B2 |
| A15 | A10, A11, A12, A14 |
| A16 | A17, B4 |
| A17 | A16, B4 |

FIG. 21

| SHARED CLEANING TARGET AREA | RELATED AREA |
|---|---|
| B1 | A1, A2, A8, A9, A10, A11, A13, A14 |
| B2 | A9, A10, A13, A14 |
| B3 | A4, A5, A6 |
| B4 | A1 TO A17 |

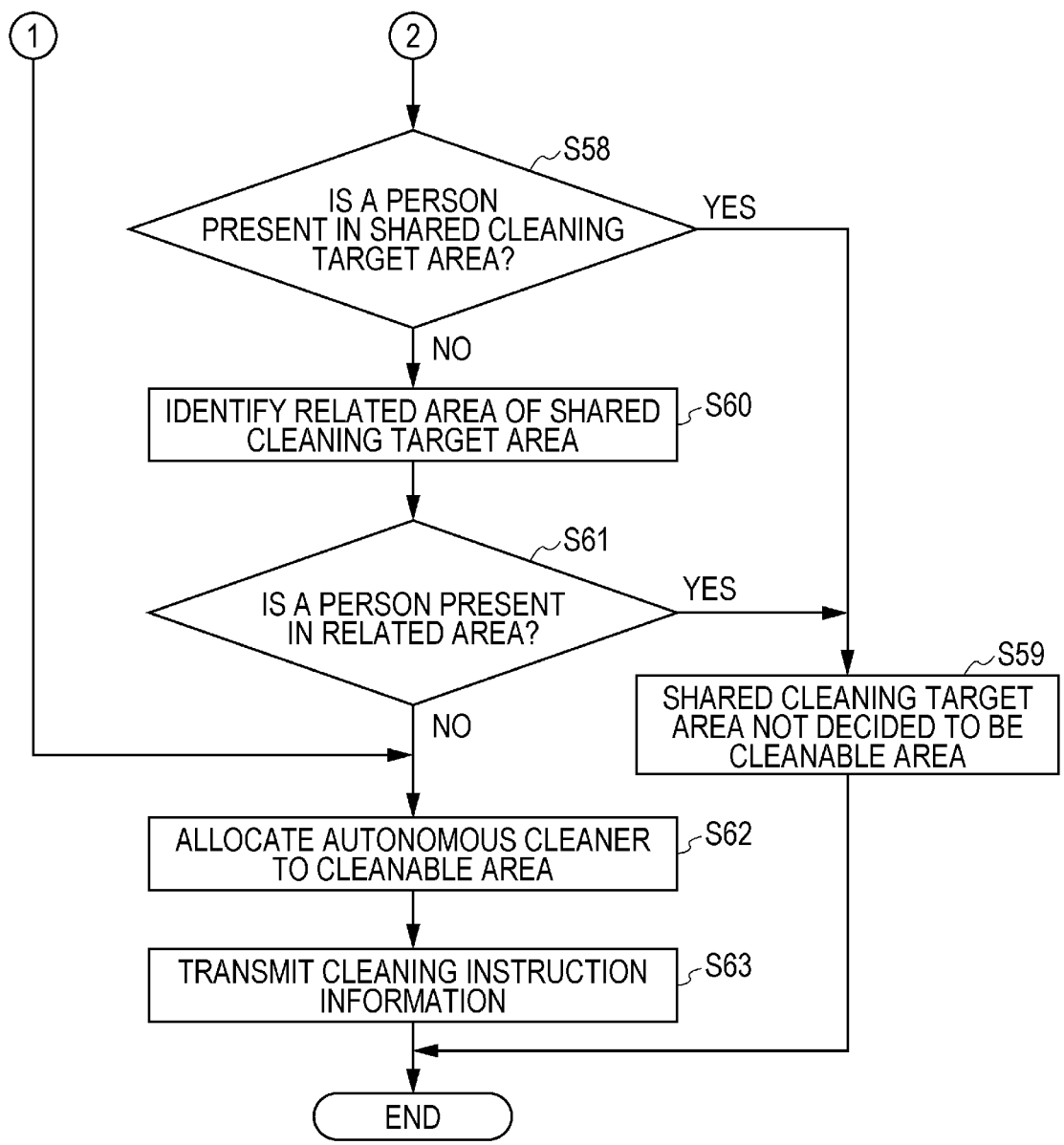

CONTROL METHOD OF AUTONOMOUS CLEANER, CONTROL DEVICE, NON-TRANSITORY COMPUTER-READABLE RECORDING MEDIUM STORING A CONTROL PROGRAM, AND AUTONOMOUS CLEANER

BACKGROUND

1. Technical Field

The present disclosure relates to a control method of controlling an autonomous cleaner, a control device, a non-transitory computer-readable recording medium storing a control program, and the autonomous cleaner.

2. Description of the Related Art

There is known an autonomous cleaner in the related art that determines whether or not a person is present in a cleaning area, and in a case of determining that there is no person present in the cleaning area, starts automated cleaning from a point that has been set beforehand, but in a case of determining that there is a person present in the cleaning area, stops automated cleaning and travels to a point that has been set beforehand (e.g., see Japanese Unexamined Patent Application Publication No. 2007-34561). The above related art discloses stopping automated cleaning in a case where a person enters the cleaning area during the autonomous cleaner performing automated cleaning, and performing automated cleaning only in a case where there is no person present in the cleaning area.

SUMMARY

However, while the related art discloses that determination is made regarding whether or not a person is present in the cleaning area, and that automated cleaning is performed only in a case where there is no person present in the cleaning area, there is no disclosure or suggestion of a method of determining whether or not a person is present in each of multiple cleaning areas, and causing the autonomous cleaner to travel based on the relationship between the judgment results and the multiple cleaning areas. Accordingly, further improvement has been needed.

One non-limiting and exemplary embodiment provides a control method of an autonomous cleaner, a control device, a non-transitory computer-readable recording medium storing a control program, and the autonomous cleaner, by which multiple cleaning target areas can be cleaned by the autonomous cleaner without making people in the vicinity feel uncomfortable.

In one general aspect, the techniques disclosed here feature a control method of a control device that controls an autonomous cleaner. The method includes: estimating a position at which a person is present in a predetermined space; identifying, with regard to each of multiple cleaning target areas obtained by dividing the predetermined space into areas individually cleaned by the autonomous cleaner, a cleaning target area at the position where the person has estimated to be present, as being a person-present cleaning target area; identifying a cleaning target area around the person-present cleaning target area as being a surrounding cleaning target area; and deciding, of the multiple cleaning target areas, the cleaning target areas other than the person-present cleaning target area and the surrounding cleaning target area to be cleanable areas.

According to the present disclosure, an autonomous cleaner can be made to clean multiple cleaning target areas without making people in the vicinity feel uncomfortable.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of surrounding area information stored in a surrounding area information storage unit in the first embodiment;

FIG. 6 is a diagram illustrating an example of surrounding area information stored in the surrounding area information storage unit in a modification of the first embodiment;

FIG. 14 is a diagram illustrating an example of first surrounding area information used in a case where remaining time from the current time of day to an end time of a time zone that has been specified beforehand is 30 minutes or more in the second embodiment;

FIG. 15 is a diagram illustrating an example of second surrounding area information used in a case where remaining time from the current time of day to an end time of a time zone that has been specified beforehand is less than 30 minutes in the second embodiment;

FIG. 20 is a diagram illustrating an example of surrounding area information stored in a surrounding area information storage unit in the third embodiment;

FIG. 21 is a diagram illustrating an example of related area information stored in a related area information storage unit in the third embodiment;

FIG. 23 is a second flowchart for describing processing at the management device according to the third embodiment.

DETAILED DESCRIPTION

Figure 1:
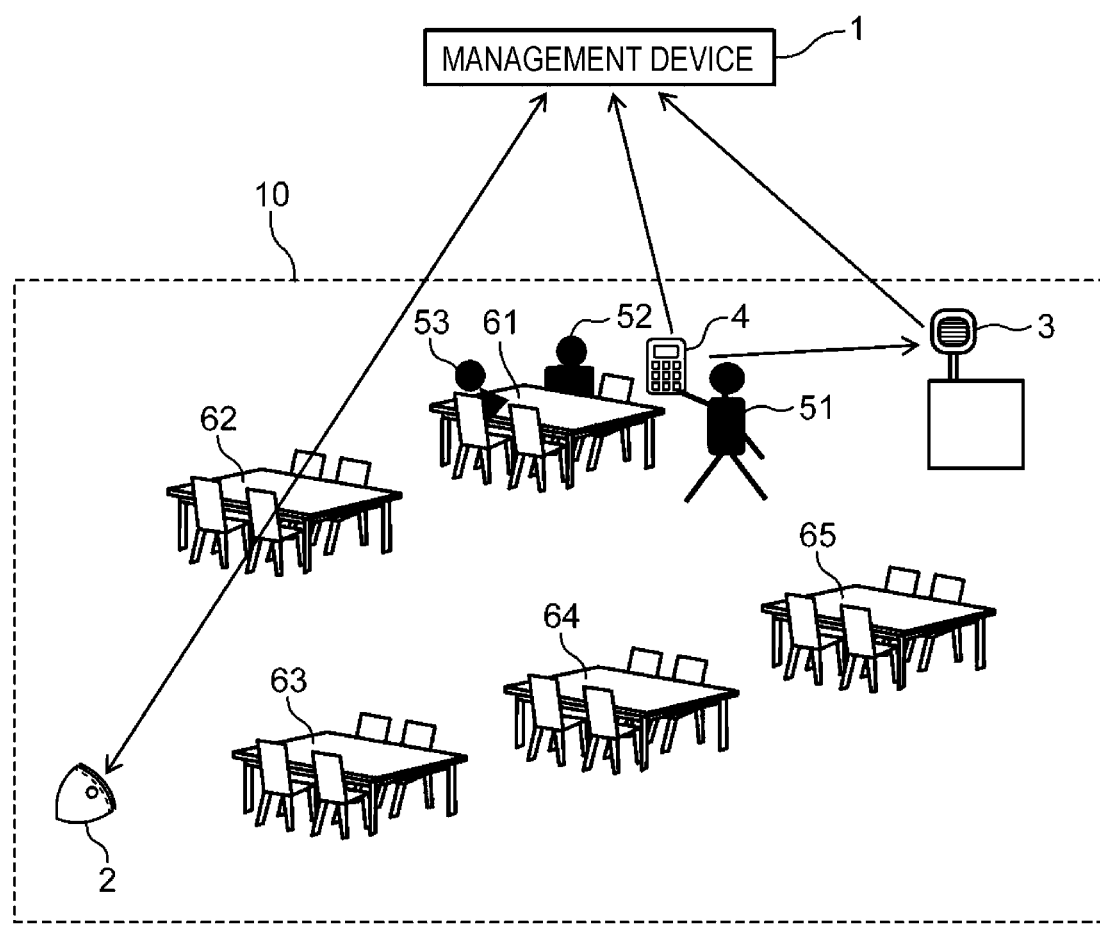
FIG. 1 is a diagram conceptually illustrating an overall image of a cleaning system according to a first embodiment.

Underlying Knowledge Forming Basis of the Present Disclosure

As described above, while the related art discloses that determination is made regarding whether or not a person is present in the cleaning area, and that automated cleaning is performed only in a case where there is no person present in the cleaning area, there is no disclosure or suggestion of a method of determining whether or not a person is present in each of multiple cleaning areas, and causing the autonomous cleaner to travel based on the relationship between the judgment results and the multiple cleaning areas.

For example, a case of a restaurant that is open 24 hours will be considered. The restaurant has tables, and around these tables are cleaning areas. An autonomous cleaner is to be used to clean multiple cleaning areas. If a restaurant is open 24 hours, this means that cleaning will take place while the restaurant is open. Accordingly, there is a need to have the autonomous cleaner to clean during a time period when there are few guests in the restaurant and customer traffic is light. Regardless of cleaning during a time period when there are few guests in the restaurant and customer traffic is light, if there are any guests in the restaurant, the related art has to determine whether there are people at each table, and have the autonomous cleaner only clean around tables regarding which determination has been made that nobody is present.

However, there is a possibility of making guests who are eating uncomfortable by having the autonomous cleaner clean using the related art. For example, in a case where determination is made that there are no guests at a table next to a table where a guest is eating, and the autonomous cleaner starts cleaning the floor of the table next to the table where the guest is eating, this may stir up dust that may reach the table where the guest is eating. In such a case, the guest may feel uncomfortable.

Further, if the autonomous cleaner starts cleaning the floor of the table next to the table where the guest is eating, the cleaning will create noise, so the guest will have to eat while hearing the noise nearby. In this way, the method of simply determining whether or not a person is present in a cleaning area, and starting cleaning by the autonomous cleaner based on the determination results could create inconveniences depending on the situation.

A control method according to a first aspect of the present disclosure is a control method of a control device that controls an autonomous cleaner. The method includes: estimating a position at which a person is present in a predetermined space; identifying, with regard to each of multiple cleaning target areas obtained by dividing the predetermined space into areas individually cleaned by the autonomous cleaner, a cleaning target area at the position where the person has estimated to be present, as being a person-present cleaning target area; identifying a cleaning target area around the person-present cleaning target area as being a surrounding cleaning target area; and deciding, of the multiple cleaning target areas, the cleaning target areas other than the person-present cleaning target area and the surrounding cleaning target area to be cleanable areas.

According to this configuration, a position at which a person is present in a predetermined space is estimated. With regard to each of multiple cleaning target areas obtained by dividing the predetermined space into areas individually cleaned by the autonomous cleaner, a cleaning target area at the position where the person has estimated to be present is identified as being a person-present cleaning target area. A cleaning target area around the person-present cleaning target area is identified as being a surrounding cleaning target area. Of the multiple cleaning target areas, the cleaning target areas other than the person-present cleaning target area and the surrounding cleaning target area are decided to be cleanable areas.

Thus, of the multiple cleaning target areas, the cleaning target areas other than the person-present cleaning target area and the surrounding cleaning target area around the person-present cleaning target area are decided to be cleanable areas, so the autonomous cleaner can be made to clean multiple cleaning target areas without making people in the vicinity feel uncomfortable.

The control method may further include outputting cleaning instruction information to cause the autonomous cleaner to clean the cleanable area that has been decided.

According to this configuration, cleaning instruction information is output to cause the autonomous cleaner to clean the cleanable area that has been decided, so the autonomous cleaner can be made to clean the cleanable area.

The control method may further include identifying the surrounding cleaning target area of the identified person-present cleaning target area, based on surrounding area information correlating each of the multiple cleaning target areas and surrounding cleaning target area beforehand.

According to this configuration, the surrounding cleaning target area of the identified person-present cleaning target area is identified, based on surrounding area information correlating each of the multiple cleaning target areas and surrounding cleaning target area beforehand.

Accordingly, the surrounding cleaning target area of the identified person-present cleaning target area can be easily identified, using surrounding area information correlating each of the multiple cleaning target areas and surrounding cleaning target area beforehand.

The control method may further include identifying the cleaning target areas located within a predetermined range from a position where the person is estimated to be, as being the surrounding cleaning target area.

According to this configuration, the cleaning target areas located within a predetermined range from a position where the person is estimated to be are identified as being the surrounding cleaning target area, so cleaning target areas that are a predetermined range or more away from a position where people are can be cleaned.

In the control method, the surrounding cleaning target area may be adjacent to the person-present cleaning target area and share at least one side or one point with the person-present cleaning target area.

According to this configuration, cleaning target areas other than surrounding cleaning target areas adjacent to a person-present cleaning target area can be decided as being cleanable areas.

The control method may further include outputting, in a case where multiple cleanable areas have been identified as the cleanable areas, the cleaning instruction information to cause the autonomous cleaner to clean the cleanable area out of the multiple cleanable areas that is at a position farthest from the person-present cleaning target area.

According to this configuration, in a case where multiple cleanable areas have been identified as the cleanable areas, cleaning instruction information is output to cause the autonomous cleaner to clean the cleanable area out of the multiple cleanable areas that is at a position farthest from the person-present cleaning target area.

Thus, the cleanable area that is at a position farthest from the position where people are present is cleaned by the autonomous cleaner, so the effects of flying dust due to cleaning can be minimized at the person-present cleaning target area where people are present.

The control method may further include outputting, in a case where position information indicating the current position of the autonomous cleaner is obtained and multiple cleanable areas have been identified as the cleanable areas, the cleaning instruction information to cause the autonomous cleaner to clean the cleanable area out of the multiple cleanable areas that is closest to the current position of the autonomous cleaner.

According to this configuration, the position information which indicates the current position of the autonomous cleaner is obtained. In a case where multiple cleanable areas have been identified as the cleanable areas, cleaning instruction information is output to cause the autonomous cleaner to clean the cleanable area out of the multiple cleanable areas that is closest to the current position of the autonomous cleaner.

Thus, the travel time from the current position of the autonomous cleaner to a cleanable area can be reduced.

The control method may further include managing cleaning history of the autonomous cleaner with regard to each of the multiple cleaning target areas and outputting, in a case where multiple cleanable areas have been identified as the cleanable areas, the cleaning instruction information to cause the autonomous cleaner to clean the cleanable area out of the multiple cleanable areas, regarding which the amount of time elapsed from a last cleaning end time of day included in the cleaning history is the longest.

According to this configuration, cleaning history of the autonomous cleaner is managed with regard to each of the multiple cleaning target areas. In a case where multiple cleanable areas have been identified as the cleanable areas, cleaning instruction information is output to cause the autonomous cleaner to clean the cleanable area out of the multiple cleanable areas, regarding which the amount of time elapsed from a last cleaning end time of day included in the cleaning history is the longest.

Thus, the autonomous cleaner is made to clean the cleanable area regarding which the amount of time elapsed from the last cleaning end time of day is the longest, so areas where the most dust is estimated to have accumulated can be cleaned with priority.

The control method may further include: managing cleaning history of the autonomous cleaner with regard to each of the multiple cleaning target areas; re-estimating, in a case where cleaning of the cleanable areas by the autonomous cleaner has been completed, the position at which a person is present; re-identifying a cleaning target area where the person has been re-estimated to be present, with regard to each for the multiple cleaning target areas, as being the person-present cleaning target areas; re-identifying a cleaning target area around the person-present cleaning target area as being the surrounding cleaning target area; and deciding, of the multiple cleaning target areas, the cleaning target areas, which are other than the person-present cleaning target area and the surrounding cleaning target area and regarding which cleaning has not been completed, to be cleanable areas.

According to this configuration, cleaning history of the autonomous cleaner is managed with regard to each of the multiple cleaning target areas. In a case where cleaning of the cleanable areas by the autonomous cleaner has been completed, the position at which a person is present is re-estimated. A cleaning target area is re-identified where the person has been re-estimated to be present, with regard to each for the multiple cleaning target areas, as being the person-present cleaning target areas. A cleaning target area around the person-present cleaning target area is re-identified as being the surrounding cleaning target area. Of the multiple cleaning target areas, the cleaning target areas, which are other than the person-present cleaning target area and the surrounding cleaning target area and regarding which cleaning has not been completed, are decided to be cleanable areas.

Thus, the next cleanable area can be decided immediately after completing cleaning of a cleanable area by the autonomous cleaner. Accordingly, the autonomous cleaner can be made to consecutively clean cleanable areas without returning to the initial position, so the autonomous cleaner can be made to clean more efficiently.

The control method may further include managing cleaning time zone information indicating a time zone specified beforehand, in which the autonomous cleaner performs cleaning, and outputting, in a case where a current time of day is within the time zone indicated by the cleaning time zone information, the cleaning instruction information.

According to this configuration, cleaning time zone information indicating a time zone specified beforehand, in which the autonomous cleaner performs cleaning, is managed. In a case where a current time of day is within the time zone indicated by the cleaning time zone information, cleaning instruction information is output.

Accordingly, the autonomous cleaner can be run in a time zone when customer traffic is light and not a time zone when customer traffic is heavy, so a greater number of cleaning target areas can be cleaned.

The control method further includes obtaining cleanable areas regarding which cleaning was not completed within the time zone indicated in the cleaning time zone information, as incomplete cleaning target areas, and deciding, of the multiple cleaning target areas, the cleaning target areas other than the person-present cleaning target area and the surrounding cleaning target area, and also corresponding to the incomplete cleaning target area, to be cleanable areas.

According to this configuration, cleanable areas regarding which cleaning was not completed within the time zone indicated in the cleaning time zone information are obtained as incomplete cleaning target areas. Of the multiple cleaning target areas, the cleaning target areas other than the person-present cleaning target area and the surrounding cleaning target area, and also corresponding to the incomplete cleaning target area, are decided to be cleanable areas.

Thus, cleanable areas regarding which cleaning was not completed due to the cleaning time zone having elapsed while cleaning can be cleaned with priority the next time of cleaning.

The control method may further include deciding, based on predetermined conditions, one surrounding area information set from multiple surrounding area information sets that the surrounding area information includes, and identifying a surrounding cleaning target area of the identified person-present cleaning target area based on the decided one surrounding area information set.

According to this configuration, one surrounding area information set is decided from multiple surrounding area information sets that the surrounding area information includes, based on predetermined conditions. A surrounding cleaning target area of the identified person-present cleaning target area is identified based on the decided one surrounding area information set.

Accordingly, surrounding area information to be used can be changed in accordance with predetermined conditions, so the range of cleaning target areas to be identified as surrounding cleaning target areas can be changed, and also the range of cleanable areas can be changed.

The control method may further include: judging whether or not the decided cleanable areas are shared cleaning target areas, based on related area information correlating shared cleaning target areas out of the multiple cleaning target areas that are used by multiple people at least as passages, and cleaning target areas other than the shared cleaning target areas relating to the shared cleaning target areas beforehand; identifying, in a case of having judged that the decided cleanable areas are the shared cleaning target areas, cleaning target areas correlated with the shared cleaning target areas as being related cleaning target areas, based on the related area information; judging whether or not the people are present in the identified related cleaning target areas; and deciding, in a case of having judged that people are not present in the identified related cleaning target areas, the shared cleaning target areas to be the cleanable areas.

According to this configuration, whether or not the decided cleanable areas are shared cleaning target areas is judged, based on related area information correlating shared cleaning target areas out of the multiple cleaning target areas that are used by multiple people at least as passages, and cleaning target areas other than the shared cleaning target areas relating to the shared cleaning target areas. In a case of having judged that the decided cleanable areas are the shared cleaning target areas, cleaning target areas correlated with the shared cleaning target areas are identified as being related cleaning target areas, based on the related area information. Whether or not the people are present in the identified related cleaning target areas is judged. In a case of having judged that people are not present in the identified related cleaning target areas, the shared cleaning target areas are decided to be the cleanable areas.

Accordingly, of the multiple cleaning target areas, shared cleaning target areas that multiple people use at least as passages can be cleaned without inconveniencing people.

A control device according to another aspect of the present disclosure is a control device that controls an autonomous cleaner. The device includes: processing circuitry; and storage including at least one set of instructions that, when executed by the processing circuitry, cause the processing circuitry to perform operations including estimating a position at which a person is present in a predetermined space, identifying, with regard to each of multiple cleaning target areas obtained by dividing the predetermined space into areas individually cleaned by the autonomous cleaner, a cleaning target area at the position where the person has estimated to be present, as being a person-present cleaning target area, identifying a cleaning target area around the person-present cleaning target area as being a surrounding cleaning target area, and deciding, of the multiple cleaning target areas, the cleaning target areas other than the person-present cleaning target area and the surrounding cleaning target area to be cleanable areas.

According to this configuration, a position at which a person is present in a predetermined space is estimated. With regard to each of multiple cleaning target areas obtained by dividing the predetermined space into areas individually cleaned by the autonomous cleaner, a cleaning target area at the position where the person has estimated to be present is identified as being a person-present cleaning target area. A cleaning target area around the person-present cleaning target area is identified as being a surrounding cleaning target area. Of the multiple cleaning target areas, the cleaning target areas other than the person-present cleaning target area and the surrounding cleaning target area are decided to be cleanable areas.

Thus, of the multiple cleaning target areas, the cleaning target areas other than the person-present cleaning target area where a person is present and the surrounding cleaning target area around the person-present cleaning target area are decided to be cleanable areas, so the autonomous cleaner can be made to clean multiple cleaning target areas without making people in the vicinity feel uncomfortable.

A non-transitory computer-readable recording medium according to another aspect of the present disclosure is a non-transitory computer-readable recording medium storing a control program to control an autonomous cleaner. When executed by a computer, the program causes the computer to execute a method including estimating a position at which a person is present in a predetermined space, identifying, with regard to each of multiple cleaning target areas obtained by dividing the predetermined space into areas individually cleaned by the autonomous cleaner, a cleaning target area at the position where the person has estimated to be present, as being a person-present cleaning target area, identifying a cleaning target area around the person-present cleaning target area as being a surrounding cleaning target area, and deciding, of the multiple cleaning target areas, the cleaning target areas other than the person-present cleaning target area and the surrounding cleaning target area to be cleanable areas.

According to this configuration, a position at which a person is present in a predetermined space is estimated. With regard to each of multiple cleaning target areas obtained by dividing the predetermined space into areas individually cleaned by the autonomous cleaner, a cleaning target area at the position where the person has estimated to be present is identified as being a person-present cleaning target area. A cleaning target area around the person-present cleaning target area is identified as being a surrounding cleaning target area. Of the multiple cleaning target areas, the cleaning target areas other than the person-present cleaning target area and the surrounding cleaning target area are decided to be cleanable areas.

Thus, of the multiple cleaning target areas, the cleaning target areas other than the person-present cleaning target area where a person is present and the surrounding cleaning target area around the person-present cleaning target area are decided to be cleanable areas, so the autonomous cleaner can be made to clean multiple cleaning target areas without making people in the vicinity feel uncomfortable.

An autonomous cleaner according to another aspect of the present disclosure is an autonomous cleaner that cleans while autonomously traveling. The autonomous cleaner includes processing circuitry; and storage including at least one set of instructions that, when executed by the processing circuitry, cause the processing circuitry to perform operations including estimating a position at which a person is present in a predetermined space, identifying, with regard to each of multiple cleaning target areas obtained by dividing the predetermined space into areas individually cleaned by the autonomous cleaner, a cleaning target area at the position where the person has estimated to be present, as being a person-present cleaning target area, identifying a cleaning target area around the person-present cleaning target area as being a surrounding cleaning target area, deciding, of the multiple cleaning target areas, the cleaning target areas other than the person-present cleaning target area and the surrounding cleaning target area to be cleanable areas, and traveling to the cleanable area and cleaning the cleanable area According to this configuration, a position at which a person is present in a predetermined space is estimated. With regard to each of multiple cleaning target areas obtained by dividing the predetermined space into areas individually cleaned by the autonomous cleaner, a cleaning target area at the position where the person has estimated to be present is identified as being a person-present cleaning target area. A cleaning target area around the person-present cleaning target area is identified as being a surrounding cleaning target area. Of the multiple cleaning target areas, the cleaning target areas other than the person-present cleaning target area and the surrounding cleaning target area are decided to be cleanable areas.

Thus, of the multiple cleaning target areas, the cleaning target areas other than the person-present cleaning target area where a person is present and the surrounding cleaning target area around the person-present cleaning target area are decided to be cleanable areas, so the autonomous cleaner can be made to clean multiple cleaning target areas without making people in the vicinity feel uncomfortable.

Embodiments of the present disclosure will be described below with reference to the drawings. Note that the embodiments below are exemplary specific forms of the present disclosure, and do not restrict the technical scope of the present disclosure.

First Embodiment

In the first embodiment, description will be made regarding a method where, in a situation where there are multiple cleaning target areas in an eatery, cleaning target areas excluding cleaning target areas where guests are present and cleaning target areas around that cleaning target, are decided to be cleanable areas, and the autonomous cleaner is caused to travel to decided cleanable areas and clean.

FIG. 1 is a diagram conceptually illustrating an overall image of a cleaning system according to the first embodiment. The cleaning system illustrated in FIG. 1 includes a point-of-sales (POS) cash register 3 within the eatery 10, a portable data terminal 4 that an employee 51 carries, an autonomous cleaner 2, and a management device 1 that is outside of the eatery 10.

Multiple tables 61 through 65 are arrayed within the eatery 10, and there is the employee 51 carrying the portable data terminal 4 and guests 52 and 53 at table 61. The autonomous cleaner 2 is cleaning the floor at table 63, which is other than the table 61 where a guest is present and tables 62, 64, and 65 nearby the table 61. A cleaning target area is set beforehand in the first embodiment, correlated with each table. That is to say, each of the multiple cleaning target areas, where the two-dimensional space inside the eatery 10 has been divided into individual areas to be cleaned by the autonomous cleaner 2, are formed for each of the multiple tables.

The management device 1 is a server, for example, and is installed inside or outside of the eatery. The management device 1 receives payment information transmitted from the POS cash register 3, and also receives order information transmitted from the portable data terminal 4, and the received payment information and order information are stored in a storage unit. When starting cleaning by the autonomous cleaner 2, the management device 1 first judges at which tables (cleaning target areas) there are guests, based on the payment information received from the POS cash register 3 and the order information received from the portable data terminal 4.

The management device 1 then identifies person-present cleaning target areas corresponding to tables where guests are present, and surrounding cleaning target areas that are cleaning target areas around the person-present cleaning target areas, based on surrounding area information that correlates each of the multiple cleaning target areas that have been stored beforehand, with surrounding cleaning target areas that are cleaning target areas around the cleaning target areas. The management device 1 further decides, of the multiple cleaning target areas, cleaning target areas other than person-present cleaning target areas corresponding to tables where guests are present, and surrounding cleaning target areas corresponding to tables around tables where guests are present, to be cleanable areas. The management device 1 outputs cleaning instruction information to the autonomous cleaner 2, to clean decided cleanable areas. The autonomous cleaner 2 travels to the cleanable area specified in the cleaning instruction information, and cleans the cleanable area, based on the cleaning instruction information received from the management device 1.

In payment processing for a meal or the like, the POS cash register 3 transfers payment information such as monetary amount registration results input by the employee 51 and so forth to the management device 1 via a local area network (LAN) that is omitted from illustration, for example. Payment information includes, for example, information such as the sales amount input by the employee 51, table identification information for identifying the table of the guest paying, order identification information for identifying order information, the number of guests at that table, the time of day of payment processing, and so forth.

The portable data terminal 4 transfers the order information input by the employee 51 to the POS cash register 3 and management device 1 via the unshown LAN, for example. The order information includes, for example, information such as the content of guest orders input by the employee 51, table identification information for identifying the table at which the order was taken, order identification information for identifying the order information, the number of guests, the time of day that the order was input, and so forth.

Although the portable data terminal 4 transmits the order information to the management device 1 in the first embodiment, this is not restricted in particular in the present disclosure. The POS cash register 3 may transmit order information received from the portable data terminal 4 to the management device 1.

The configurations of the management device 1 and autonomous cleaner 2 will be described below in detail. FIG.

2 is a block diagram illustrating the configuration of the management device 1 according to the first embodiment. The management device 1 includes a communication unit 11, a control unit 12, and a storage unit 13.

The communication unit 11 receives payment information from the POS cash register 3, receives order information from the portable data terminal 4, transmits cleaning instruction information to the autonomous cleaner 2, and so forth. The communication unit 11 exchanges various types of information with an external device over a LAN or wide-area network (WAN), for example.

The control unit 12 is a central processing unit (CPU) for example, and includes a central control unit 121, a communication control unit 122, a person-presence judging unit 123, a cleanable area deciding unit 124, and a cleaner allocation unit 125. The central control unit 121 performs control of storage of information to the storage unit 13, control among control components of the control unit 12, and so forth.

The communication control unit 122 controls communication of the communication unit 11, such as receiving payment information from the POS cash register 3, receiving order information from the portable data terminal 4, transmitting cleaning instruction information to the autonomous cleaner 2, and so forth.

The person-presence judging unit 123 estimates the position of a person present in a predetermined space. The person-presence judging unit 123 judges whether or not there is a person present in each of the multiple cleaning target areas. The cleaning target areas are set corresponding to individual tables beforehand in the first embodiment, so the person-presence judging unit 123 judges whether or not there is a person present at a table, i.e., in a cleaning target area, by judging whether or not the table is unoccupied. Given the nature of eateries that guests will spend the greater part of their time at their table, judging whether or not a table is unoccupied enables determination of whether or not a person is present in the cleaning target area.

Specifically, the person-presence judging unit 123 extracts the newest order information from order information received from the portable data terminal 4. The person-presence judging unit 123 then judges whether or not order identification information that is the same as the order identification information in the extracted order information exists in payment information received from the POS cash register 3. In a case of judging that the same order identification information exists in the payment information, this means that the guest has already paid, so the person-presence judging unit 123 judges that the table is unoccupied. In a case of judging that the same order identification information does not exist in the payment information, this means that the guest has not paid yet, so the person-presence judging unit 123 judges that the table is not unoccupied. The person-presence judging unit 123 thus judges whether or not people are present in cleaning target areas, based on judgment results regarding whether tables are unoccupied or not.

With regard to the multiple cleaning target areas obtained by dividing the predetermined space into areas to be individually cleaned by the autonomous cleaner 2, the cleanable area deciding unit 124 identifies cleaning target areas at positions where people have been estimated to be present as person-present cleaning target areas. The cleanable area deciding unit 124 also identifies cleaning target areas around the person-present cleaning target areas as surrounding cleaning target areas. Further, of the multiple cleaning target areas, the cleanable area deciding unit 124 decides cleaning target areas other than the person-present cleaning target areas and surrounding cleaning target areas to be cleanable areas.

The cleanable area deciding unit 124 first identifies the person-present cleaning target areas where people are present, that have been judged by the person-presence judging unit 123, and the surrounding cleaning target areas of the person-present cleaning target areas, based on information of surrounding areas of each of the cleaning target areas that has been stored beforehand. Next, the cleanable area deciding unit 124 decides, of all cleaning target areas, cleaning target areas other than the person-present cleaning target areas and the surrounding cleaning target areas of the person-present cleaning target areas, to be cleanable areas.

The cleaner allocation unit 125 allocates the autonomous cleaner 2 to cleanable areas decided by the cleanable area deciding unit 124. The cleaner allocation unit 125 outputs cleaning instruction information to cause the autonomous cleaner 2 to clean the decided cleanable areas.

The storage unit 13 is semiconductor memory for example, and includes a floor plan information storage unit 1301, a cleaning target area storage unit 1302, a surrounding area information storage unit 1303, a cleaning history storage unit 1304, a cleaner information storage unit 1305, an order information history storage unit 1306, a payment information history storage unit 1307, a person-presence judgment program storage unit 1308, a cleanable area deciding program storage unit 1309, and a cleaner allocation program storage unit 1310.

The floor plan information storage unit 1301 stores floor plan information that is map information of the entire predetermined space that is the object of cleaning. The floor plan information in the first embodiment is information indicating the floor plan of the eatery 10. The communication control unit 122 obtains the floor plan information created at the time of designing the eatery 10 for example, from an external server or the like, and stores in the floor plan information storage unit 1301. Any method of obtaining floor plan information may be used at this time. For example, an autonomous cleaner 2 having a map creating function may create map information of the inside of the eatery while traveling through the eatery, and the management device 1 may obtain created map information from the autonomous cleaner 2 and store in the floor plan information storage unit 1301.

The cleaning target area storage unit 1302 stores information indicating cleaning target areas set in the floor plan information. Setting of the cleaning target area may be automatically set based on the positions of tables in the floor plan information or on table sizes, or may be set by a user such as the owner or staff of the eatery or the like. In a case of performing settings by a user, cleaning target areas can be set by a user terminal such as a personal computer, tablet computer, smartphone (none illustrated), or the like, of the user obtaining floor plan information from the management device 1, accepting user input regarding cleaning target areas based on the floor plan information, and transmitting the accepted information regarding cleaning target areas to the management device 1. The cleaning target areas in the first embodiment are set beforehand, corresponding to each table within the eatery.

Figure 3:
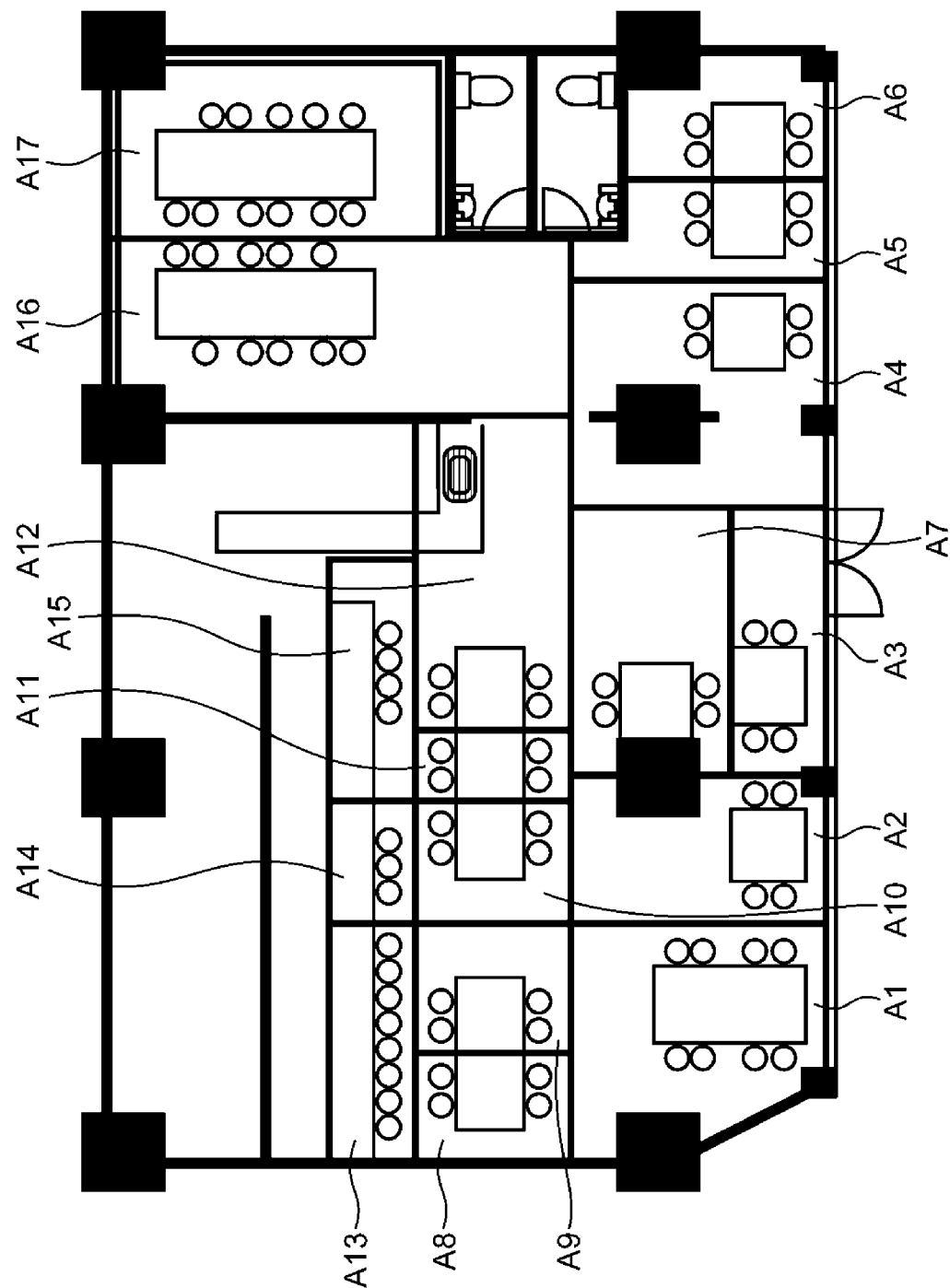
FIG. 3 is a diagram illustrating an example of information stored in a cleaning target area storage unit in the first embodiment.

FIG. 3 is a diagram illustrating an example of information stored in the cleaning target area storage unit 1302 in the first embodiment. Seventeen cleaning target areas A1 through A17 are set in the floor plan of the eatery in FIG. 3. The cleaning target areas A1 through A17 are set for each of tables in the eatery.

The surrounding area information storage unit 1303 stores surrounding area information indicating surrounding cleaning target areas around the cleaning target areas. The surrounding area information indicating the surrounding cleaning target areas of the cleaning target areas may be generated based on predetermined rules, or may be generated by accepting user input. Surrounding cleaning target areas generated based on different rules will be described with reference to FIG. 4.

FIG. 4 is a diagram illustrating an example of surrounding area information stored in the surrounding area information storage unit 1303 in the first embodiment. The surrounding area information illustrated in FIG. 4 is generated based on a rule that cleaning target areas adjacent to a cleaning target area are surrounding cleaning target areas. The surrounding area information storage unit 1303 stores surrounding area information correlating multiple cleaning target areas and surrounding cleaning target areas. In FIG. 4, cleaning target areas adjacent to a cleaning target area are set as surrounding cleaning target areas. For example, correlated with cleaning target area A1 are cleaning target areas A2, A8, A9, and A10, as surrounding cleaning target areas. The cleanable area deciding unit 124 identifies surrounding cleaning target areas corresponding to an identified person-present cleaning target area, based on surrounding area information correlating each of the multiple cleaning target areas and the surrounding cleaning target areas beforehand.

Figure 5:
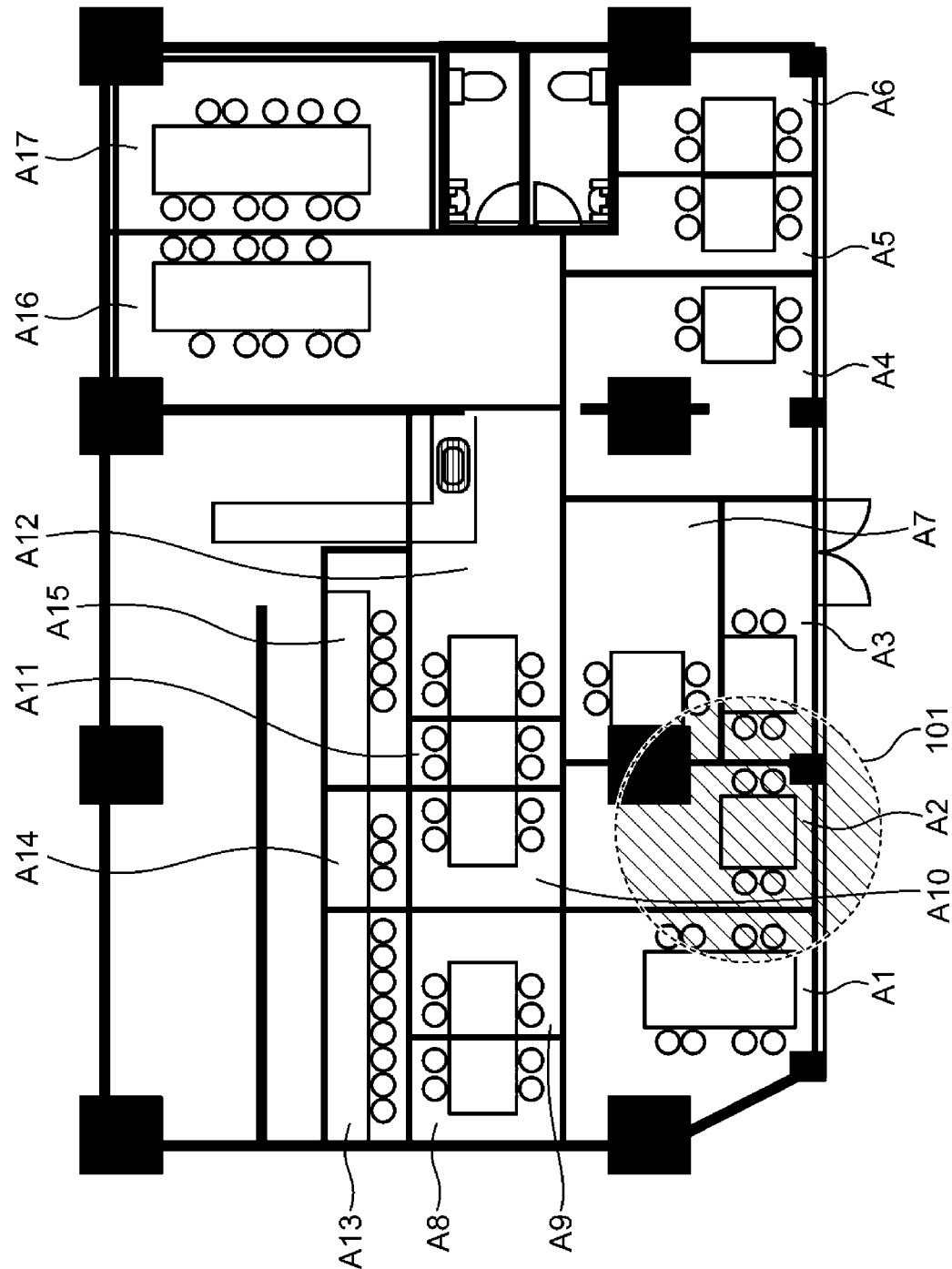
FIG. 5 is a diagram for describing a method to identify a surrounding cleaning target area in a modification of the first embodiment.

Next, a method of identifying surrounding cleaning target areas in a modification of the first embodiment will be described. FIG. 5 is a diagram for describing a method for identifying surrounding cleaning target areas in a modification of the first embodiment, and FIG. 6 is a diagram illustrating an example of surrounding area information stored in the surrounding area information storage unit 1303 in a modification of the first embodiment. In the modification of the first embodiment illustrated in FIG. 5, cleaning target areas overlapping a circular area 101 covering a predetermined distance from a center point of a table in a cleaning target area are set as surrounding cleaning target areas.

Looking at cleaning target area A2 in FIG. 5 as one example, a circular area 101 is illustrated covering a predetermined distance from a center point of the table in cleaning target area A2. In this example, the cleaning target areas A1, A3, and A7, which overlap the circular area 101, are correlated with the cleaning target area A2 as surrounding cleaning target areas.

The surrounding area information storage unit 1303 stores surrounding area information correlating each of the multiple cleaning target areas and the surrounding cleaning target areas beforehand, as illustrated in FIG. 6. For example, correlated with cleaning target area A1 are cleaning target areas A2 and A9, as surrounding cleaning target areas. The cleanable area deciding unit 124 identifies cleaning target areas within a predetermined range from a position where a person is estimated to be, as surrounding cleaning target areas.

While the center of a table in a cleaning target area is set as the center point of the circular area 101 in FIG. 5, the present disclosure is not restricted in particular to this arrangement. The center point of the circular area 101 may be set to any point within the cleaning target area, in accordance with user selection. A center point of the cleaning target area (center of gravity) may serve as the center point of the circular area 101. Although surrounding cleaning target areas are identified in FIG. 5 using the circular area 101, surrounding cleaning target areas may be identified using areas of other shapes, such as rectangles or the like.

FIGS. 4 and 6 illustrate surrounding area information generated based on predetermined rules, but corrections to surrounding area information generated based on predetermined rules may be accepted from the user. According to this configuration, the surrounding area information may be corrected in accordance with user preferences. For example, in a case where a cleaning target area has been set as a surrounding cleaning target area of a certain cleaning target area based on predetermined rules, but there is a partition between the two cleaning target areas and the user does not want to set the cleaning target area on the other side of the partition as a surrounding cleaning target area, correction can be performed so that the cleaning target areas on each side of the partition are not set to surrounding cleaning target areas of each other.

The cleaning history storage unit 1304 stores cleaning history information of each cleaning target area. This cleaning history information includes, for example, the time of day at which cleaning instruction information was transmitted to the autonomous cleaner 2, and cleaning history information transmitted from the autonomous cleaner 2. The cleaning history information transmitted from the autonomous cleaner 2 includes, for example, the time of day at which the autonomous cleaner 2 started cleaning, the time of day which the autonomous cleaner 2 completed cleaning, information indicating the state of progress of cleaning by the autonomous cleaner 2, and so forth. The information indicating the state of progress of cleaning by the autonomous cleaner 2 is, for example, information where the path of travel of the autonomous cleaner 2 is superimposed on the map information of specified cleanable areas. In a case where the autonomous cleaner 2 has discontinued cleaning due to a low battery or the like, the time of day of discontinuation and other such information may be included in the cleaning history information.

The cleaning history information stored in the cleaning history storage unit 1304 includes past cleaning history information, which includes at least cleaning history information of cleaning from the last time. Accordingly, past cleaning history can be used for cleaning the next time. For example, the cleaner allocation unit 125 can cause a cleanable area, which has not been cleaned for the longest time from the last cleaning, to be cleaned with priority.

The cleaning history storage unit 1304 manages cleaning history of the autonomous cleaner 2 regarding each of the multiple cleaning target areas. In a case where cleaning of a cleanable target area by the autonomous cleaner 2 has been completed, the person-presence judging unit 123 re-estimates positions where people are present. The cleanable area deciding unit 124 re-identifies cleaning target areas where people are re-estimated to be present as being person-present cleaning target area, and re-identifies cleaning target areas around the person-present cleaning target areas as being surrounding cleaning target areas, for each of the multiple cleaning target areas. The cleanable area deciding unit 124 then decides, out of the multiple cleaning target areas, cleaning target areas other than the person-present cleaning target areas and surrounding cleaning target areas, regarding which cleaning has not been completed, as being cleanable areas.

The cleaner information storage unit 1305 stores information relating to the autonomous cleaner 2 which the cleaner allocation unit 125 allocates to cleaning target areas. Information relating to the autonomous cleaner 2 includes, for example, identification information of the autonomous cleaner 2 for identifying the autonomous cleaner 2, and address information of the autonomous cleaner 2 for establishing communication with the autonomous cleaner 2. Information relating to the autonomous cleaner 2 may be obtained by user input from a management terminal or the like of the user, or may be obtained by setting an address of the management device 1 to the autonomous cleaner 2, so that the autonomous cleaner 2 communicates with the management device 1 and transmits information relating to the autonomous cleaner 2 thereto.

The order information history storage unit 1306 stores order information received from the portable data terminal 4. The portable data terminal 4 may transmit order information to the management device 1 each time an order is placed. Alternatively, the portable data terminal 4 may temporarily store order information in a storage unit in the portable data terminal 4, and transmit the stored order information to the management device 1 when the management device 1 inquires of the portable data terminal 4. The portable data terminal 4 may further transmit order information to the POS cash register 3. In this case, the POS cash register 3 may temporarily store the received order information, and transmit the stored order information to the management device 1 when the management device 1 inquires of the POS cash register 3.

The payment information history storage unit 1307 stores payment information received from the POS cash register 3. The communication control unit 122 receives payment information from the POS cash register 3, and stores this in the payment information history storage unit 1307.

The person-presence judgment program storage unit 1308 stores a person-presence judgment program for judging whether or not a person is present in a cleaning target area. The person-presence judgment program is executed by the person-presence judging unit 123.

The cleanable area deciding program storage unit 1309 stores a cleanable area deciding program that identifies person-present cleaning target areas where people are present, which have been judged by the person-presence judging unit 123, and surrounding cleaning target areas around the person-present cleaning target areas, based on surrounding area information stored beforehand, and decides cleaning target areas other than the identified person-present cleaning target areas and surrounding cleaning target areas to be cleanable areas. The cleanable area deciding program is executed by the cleanable area deciding unit 124.

The cleaner allocation program storage unit 1310 stores a cleaner allocation program for allocating the autonomous cleaner 2 to cleanable areas decided by the cleanable area deciding unit 124. The cleaner allocation program is executed by the cleaner allocation unit 125.

Figure 7:
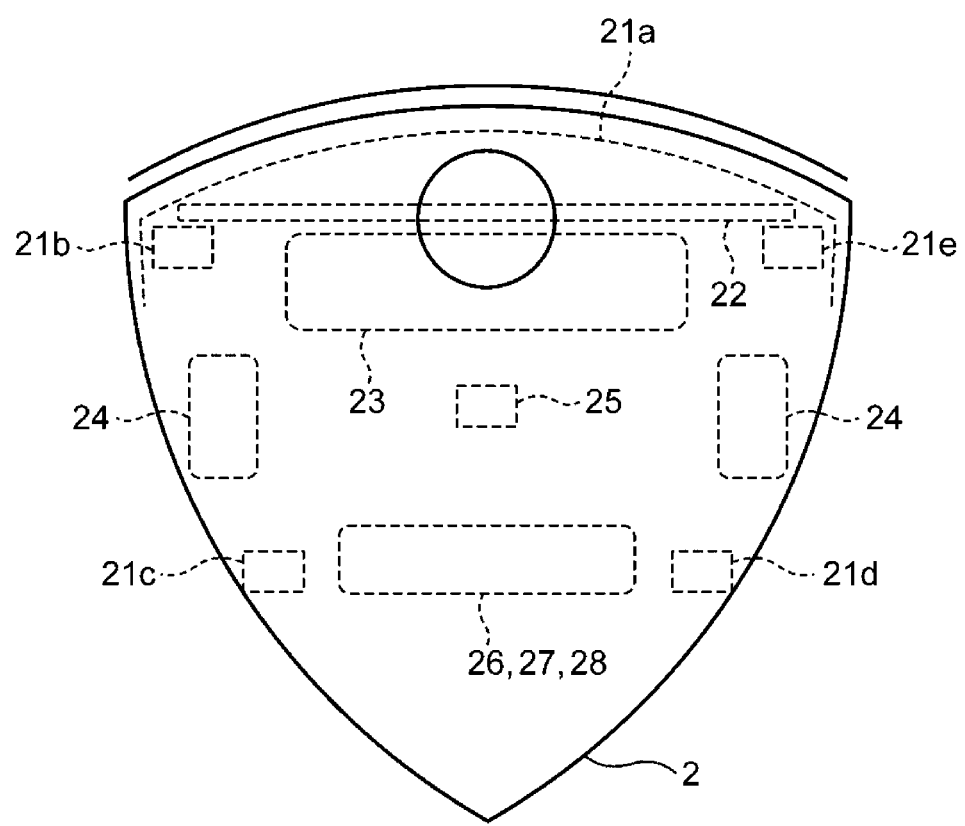
FIG. 7 is an external transparent view of an autonomous cleaner according to the first embodiment as viewed from above.
Figure 8:
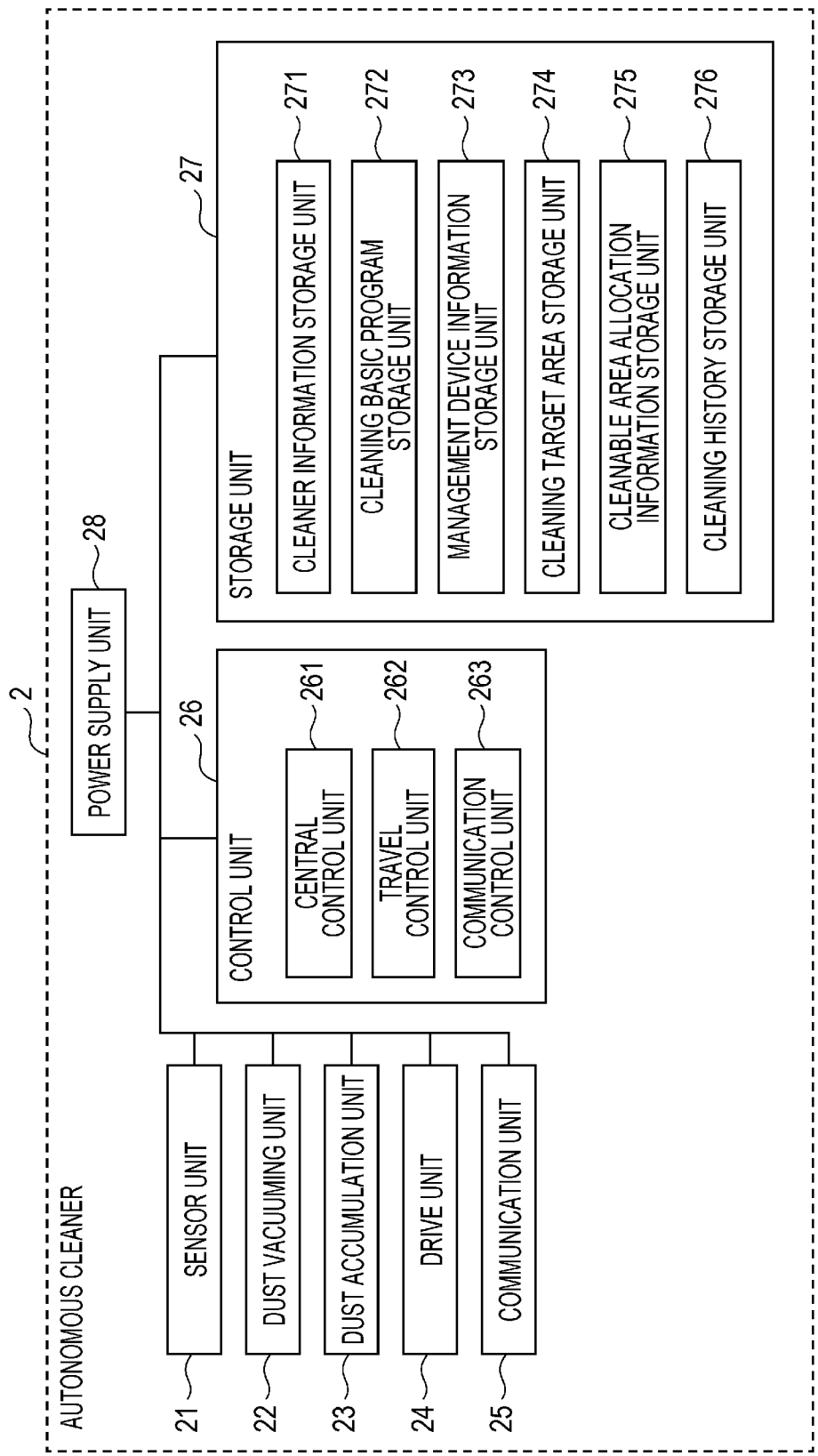
FIG. 8 is a block diagram illustrating the functional configuration of the autonomous cleaner according to the first embodiment.

FIG. 7 is an external transparent view of the autonomous cleaner 2 according to the present embodiment as viewed from above. FIG. 8 is a block diagram illustrating the functional configuration of the autonomous cleaner 2 according to the present embodiment. The autonomous cleaner 2 includes a sensor unit 21, a dust vacuuming unit 22, a dust accumulation unit 23, a drive unit 24, a communication unit 25, a control unit 26, a storage unit 27, and a power supply unit 28.

The sensor unit 21 is a sensor to sense the situation around the autonomous cleaner 2 and/or the state of the autonomous cleaner 2. The sensor unit 21 includes an obstacle sensor that emits infrared rays or ultrasonic waves for example, and measures the infrared rays or ultrasonic waves reflected back from obstacles, thereby measuring distances to obstacles and detecting obstacles, a contact sensor that detects obstacles by coming into contact with objects in a case where the obstacle sensor is not able to judge obstacles, a gyro sensor that measures the angle of the body of the autonomous cleaner 2, a travel sensor that measures the distance that the autonomous cleaner 2 has traveled, and so forth. FIG. 7 illustrates an example where the sensor unit 21 has a contact sensor 21a that is one type of sensor, and obstacle sensors 21b through 21e.

The dust vacuuming unit 22 is configured including a motor, fan, filter, and exhaust vent, for example (all omitted from illustration). When the motor rotates the fan, dust is suctioned along with air, just the air passes through the filter, and the air alone that has passed through is blown out from the exhaust vent. Dust that has been suctioned by the dust vacuuming unit 22 is accumulated in the dust accumulation unit 23.

The drive unit 24 moves the autonomous cleaner 2. The drive unit 24 is configured of a motor and wheels, for example (all omitted from illustration), and causes the autonomous cleaner 2 to travel by controlling the rotation of the motor and rotating the wheels.

The communication unit 25 transmits and receives information to and from external devices such as the management device 1, via a LAN or WAN. The communication unit 25 receives cleaning instruction information instructing cleaning of cleanable areas from the measurement device 1, and transmits cleaning history information to the management device 1, for example.

The control unit 26 is a CPU for example, and controls the operations of the autonomous cleaner 2. The control unit 26 includes a central control unit 261, a travel control unit 262, and a communication control unit 263.

The storage unit 27 is semiconductor memory for example, and includes a cleaner information storage unit 271, a cleaning basic program storage unit 272, a management device information storage unit 273, a cleaning target area storage unit 274, a cleanable area allocation information storage unit 275, and a cleaning history storage unit 276.

The central control unit 261 controls the components of the autonomous cleaner 2. The communication control unit 263 controls the communication unit 25, and transmits and receives various types of information via the communication unit 25.

The cleaner information storage unit 271 stores information relating to the autonomous cleaner 2. Examples of information relating to the autonomous cleaner 2 include identification information for identifying the autonomous cleaner 2 and communication address information of the autonomous cleaner 2.

The cleaning basic program storage unit 272 stores a cleaning basic program to cause the autonomous cleaner 2 to travel, based on predetermined movement patterns. The cleaning basic program is stored beforehand, at the time of manufacturing. When cleaning a cleanable area specified by the management device 1, the travel control unit 262 selects one of predetermined movement patterns based on the cleaning basic program stored in the cleaning basic program storage unit 272, and controls the drive unit 24 to cause the autonomous cleaner 2 to travel and perform cleaning, based on the selected pattern. Examples of movement patterns include wall-following traveling where the autonomous cleaner 2 travels following an obstacle such as a wall or the like, zig-zag travelling where the autonomous cleaner 2 travels in a zig-zag pattern, random travelling where the autonomous cleaner 2 travels randomly, spiral traveling where the autonomous cleaner 2 travels in a spiral, and so forth for example. The travel control unit 262 performs cleaning by traveling while changing movement patterns in accordance with the situation around the autonomous cleaner 2 and the state of the autonomous cleaner 2. The autonomous cleaner 2 may have a configuration to access a server or the like of the manufacturer of the autonomous cleaner 2 and acquire an update program for the cleaning basic program, thereby updating movement patterns.

The management device information storage unit 273 stores information relating to the management device 1. Information relating to the management device 1 includes identification information for identifying the management device 1 and communication address information of the management device 1, for example. Information relating to the management device 1 may be stored beforehand at the time of manufacturing, or may be set by the user.

The cleaning target area storage unit 274 acquires from the management device 1 and stores information indicating cleaning target areas set in the floor plan information. The autonomous cleaner 2 travels to a cleanable area specified by cleaning instruction information received from the management device 1, based on information indicating cleaning target areas.

The cleanable area allocation information storage unit 275 stores information indicating a cleanable area specified in cleaning instruction information received from the management device 1. The autonomous cleaner 2 travels to the cleanable area indicated in this information, and performs cleaning.

The cleaning history storage unit 276 stores cleaning history information of having cleaned the cleanable area specified by the cleaning instruction information received from the management device. The cleaning history information includes information such as the time of day that the autonomous cleaner 2 started cleaning, the time of day that the autonomous cleaner 2 completed cleaning, process information indicating the state of process of cleaning by the autonomous cleaner 2, and so forth. The cleaning history information is stored in the management device 1 in the same way, but also is stored in the autonomous cleaner 2. That is to say, if the autonomous cleaner 2 travels to a place where communication signals are not good while cleaning, the cleaning history information at that point cannot be transmitted to the management device 1, so the autonomous cleaner 2 stores the cleaning history information. Accordingly, when communication signals are stronger, the autonomous cleaner 2 can transmit the stored cleaning history information to the management device 1.

The power supply unit 28 is a battery that supplies electric power to the components of the autonomous cleaner 2.

Next, a method according to the present embodiment will be described, where the autonomous cleaner 2 is cause to travel to and clean cleanable areas, which have been identified by excluding, from the multiple cleaning target areas, person-present cleaning target areas where people are present, and surrounding cleaning target areas around the person-present cleaning target areas. Description will be made with reference to FIGS. 4, 9, and 10.

Figure 9:
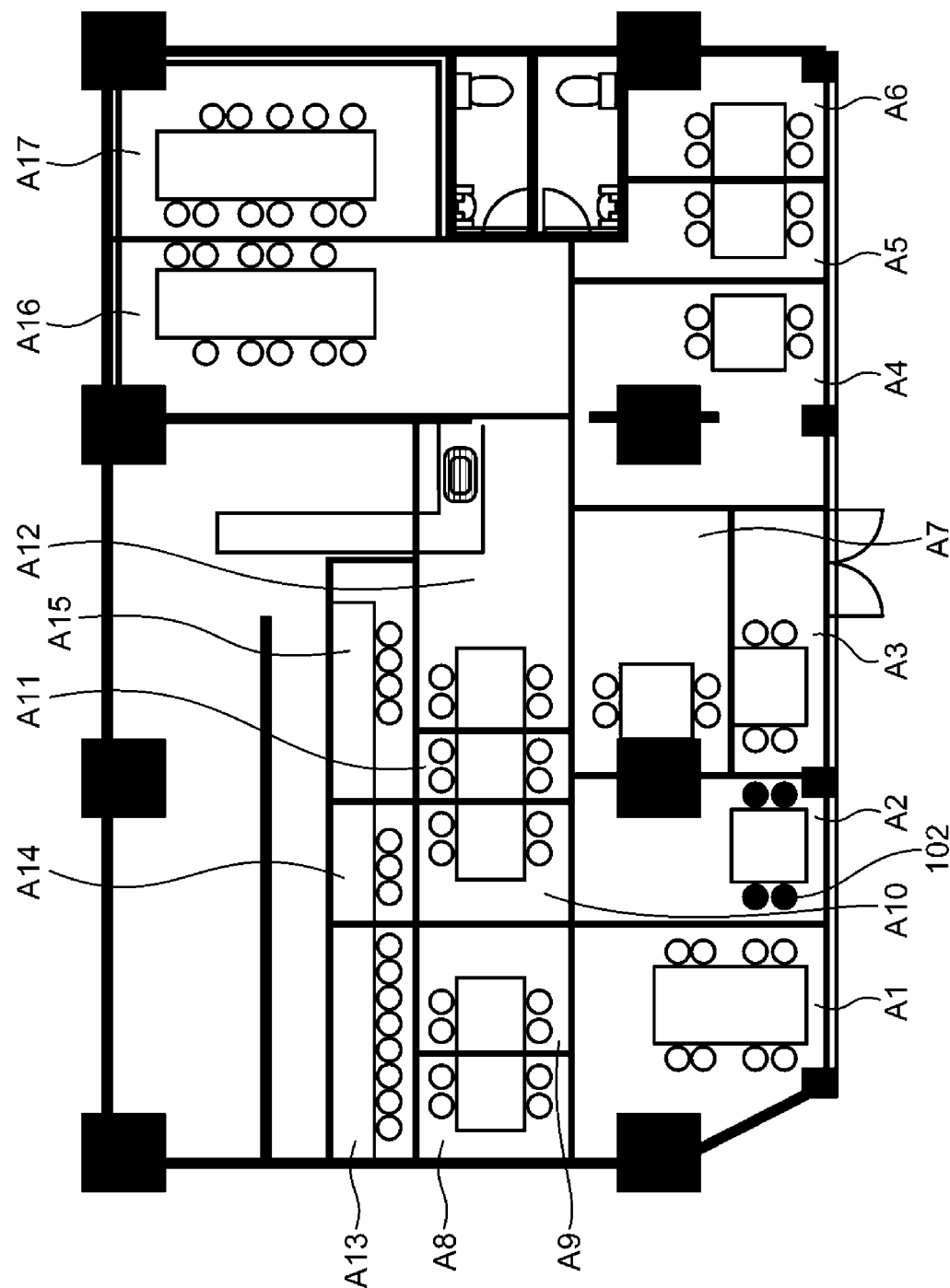
FIG. 9 is a diagram illustrating a state where people have been mapped in one cleaning target area out of multiple cleaning target areas in the first embodiment.
Figure 10:
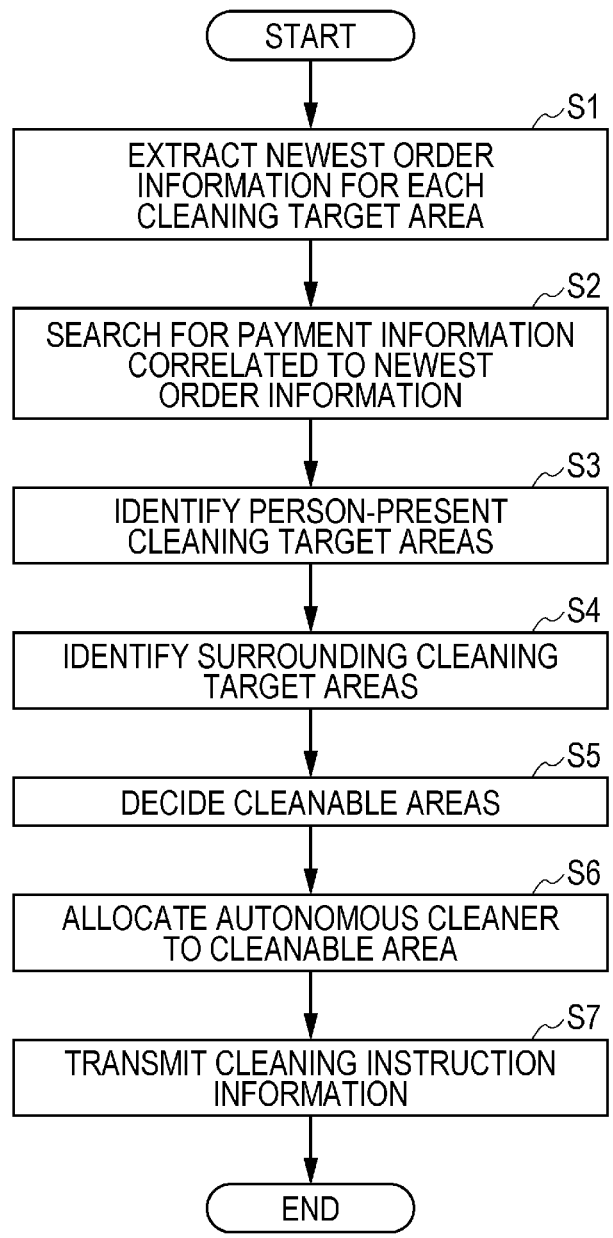
FIG. 10 is a flowchart for describing processing at the management device according to the first embodiment.

FIG. 9 is a diagram where people have been mapped into one cleaning target area out of the multiple cleaning target areas in the first embodiment. FIG. 10 is a flowchart for describing processing of the management device 1 in the first embodiment. The flowchart in FIG. 10 will be described in detail with reference to FIGS. 4 and 9. Multiple cleaning target areas A1 through A17 are set on the floor plan in FIG. 9, indicating that there is a person present in cleaning target area A2. FIG. 4 illustrates the surrounding cleaning target areas for each cleaning target area illustrated in FIG. 9.

First, the person-presence judging unit 123 of the management device 1 extracts the newest order information of the tables correlated with the cleaning target areas, from order information stored in the order information history storage unit 1306 (step S1). In a case where the order information stored in the management device 1 is not the newest order information, the person-presence judging unit 123 obtains the newest order information from the portable data terminal 4, and thereafter performs the processing of step S1.

Next, the person-presence judging unit 123 searches the payment information history storage unit 1307 for payment information correlated with the order information that has been extracted (step S2). In a case where the payment information stored in the management device 1 is not the newest payment information, the person-presence judging unit 123 obtains the newest payment information from the POS cash register 3, and thereafter performs the processing of step S2. The person-presence judging unit 123 searches the payment information present in the payment information history storage unit 1307 for payment information including the same order identification information as the order identification information included in the extracted order information.

Next, the person-presence judging unit 123 identifies person-present cleaning target areas where people are present from the multiple cleaning target areas, based on the search results (step S3). In a case where payment information correlated with the order information exists as a result of the search, the person-presence judging unit 123 judges that payment has ended for the table corresponding to this payment information, and that there is nobody in the cleaning target area where this table is included. On the other hand, in a case where payment information correlated with the order information does not exist as a result of the search, the person-presence judging unit 123 judges that payment has not been made yet for the table corresponding to this payment information, and that there is a person in the cleaning target area where this table is included. In a case of having judged that there is payment information having the same order identification information as the order identification information of the order information, this means that payment has already been completed, so the person-presence judging unit 123 judges that the table is unoccupied. In a case of having judged that there is no payment information having the same order identification information as the order identification information of the order information, this means that payment has not been made yet, so the person-presence judging unit 123 judges that the table is not unoccupied. The person-presence judging unit 123 judges whether or not there are people present in the cleaning target areas, based on whether or not the tables are unoccupied. In the example illustrated in FIG. 9, there are people present in cleaning target area A2, so the cleaning target area A2 is identified as being a person-present cleaning target area.

Next, the cleanable area deciding unit 124 identifies the surrounding cleaning target areas around the person-present cleaning target areas, based on the surrounding area information relating to surrounding cleaning target areas of the cleaning target areas stored in the surrounding area information storage unit 1303 (step S4). The cleaning target area A2 is a person-present cleaning target area in the example illustrated in FIG. 9, so based on the surrounding area information in FIG. 4, the cleaning target areas A1, A3, A7, A9, A10, and A11 are identified as surrounding cleaning target areas of the cleaning target area A2. A surrounding cleaning target area is adjacent to a person-present cleaning target area and shares at least one side or one point with a person-present cleaning target area.

Figure 11:
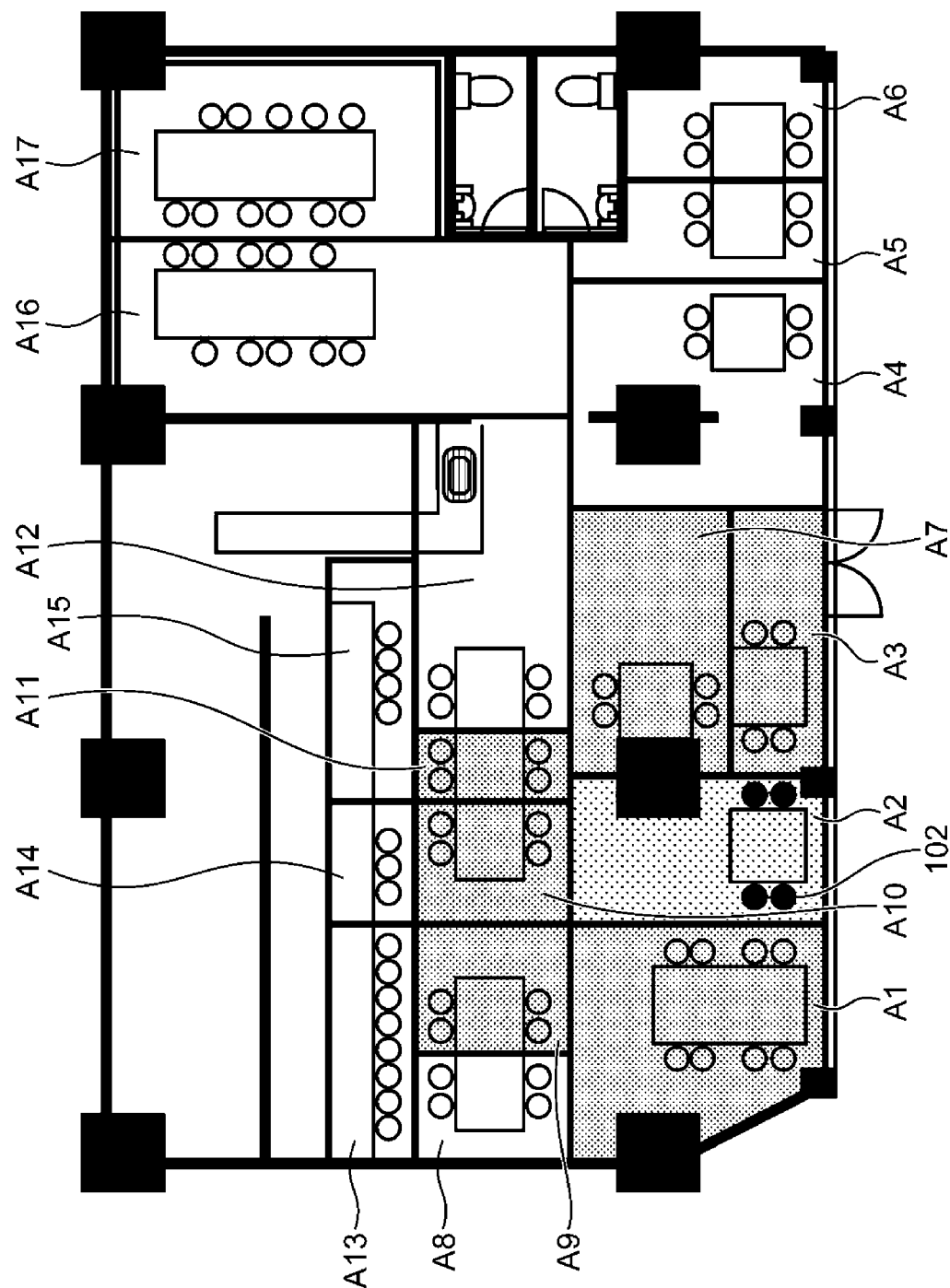
FIG. 11 is a diagram for describing a person-present cleaning target area and surrounding cleaning target areas in the first embodiment.

FIG. 11 is a diagram for describing person-present cleaning target areas and surrounding cleaning target areas in the first embodiment. FIG. 11 illustrates that the cleaning target area A2 is a person-present cleaning target area, and the cleaning target areas A1, A3, A7, A9, A10, and A11 are surrounding cleaning target areas corresponding to the cleaning target area A2. That is to say, in the example illustrated in FIG. 11, the cleaning target areas A1, A3, A7, A9, A10, and A11 are adjacent to the cleaning target area A2 that is a person-present cleaning target area, and share at least one side or point with the cleaning target area A2. Accordingly, the cleaning target areas A1, A3, A7, A9, A10, and A11 are identified as being surrounding cleaning target areas.

Next, of all cleaning target areas, the cleanable area deciding unit 124 decides, cleaning target areas excluding person-present cleaning target areas and surrounding cleaning target areas to be cleanable areas (step S5). Referencing FIG. 11, it can be seen that by excluding the cleaning target areas A1, A2, A3, A7, A9, A10, and A11 from the multiple cleaning target areas A1 through A17 leaves the cleaning target areas A4, A5, A6, A8, A12, A13, A14, A15, A16, and A17 as cleanable areas.

Next, the cleaner allocation unit 125 allocates the autonomous cleaner 2 to the cleanable areas, based on information related to the autonomous cleaner 2 stored in the cleaner information storage unit 1305 (step S6).

Next, the communication control unit 122 transmits cleaning instruction information to the autonomous cleaner 2, to clean a cleanable area (step S7). In the example illustrated in FIG. 11, the cleaning target areas A4, A5, A6, A8, A12, A13, A14, A15, A16, and A17, are cleanable areas. Accordingly, the cleaner allocation unit 125 allocates the autonomous cleaner 2 to the cleaning target areas A4, A5, A6, A8, A12, A13, A14, A15, A16, and A17 that are cleanable areas.

Now, if the number of autonomous cleaners 2 is the same as or greater than the number of cleanable areas, autonomous cleaners 2 can be moved to all of the cleanable areas to clean. However, in a case where the number of autonomous cleaners 2 is smaller than the number of cleanable areas, autonomous cleaners 2 cannot be allocated to all cleanable areas. In this case, the cleaner allocation unit 125 may select cleanable areas from the multiple cleanable areas for autonomous cleaners 2 to clean, and cause the autonomous cleaners 2 to travel to the selected cleanable areas and perform cleaning.

Now, the selection standard by which cleanable areas are selected is crucial. Demands differ from one establishment to another, so the standard for selection is preferably configured to be settable in an optional manner by the user, such as the owner of the establishment or a staff member. The following are examples of standards for selection.

As a first example of a standard for selection, the cleaner allocation unit 125 may select, from the multiple cleanable areas, a cleaning target area that is the farthest from a person-present cleaning target area. That is to say, in a case where multiple cleanable areas have been identified as cleanable areas, the cleaner allocation unit 125 outputs cleaning instruction information to cause an autonomous cleaner 2 to clean a cleanable area at a position farthest from a person-present cleaning target area, out of the multiple cleanable areas.

In the case of the first standard for selection, the cleanable area that is the farthest from the person-present cleaning target area is cleaned by the autonomous cleaner 2, so the effects of flying dust accompanying cleaning and noise accompanying cleaning can be minimized for people in the person-present cleaning target area. Any method of deciding may be used for the method of deciding the cleanable area farthest from the person-present cleaning target area. For example, the cleanable area farthest from the person-present cleaning target area may be decided by setting an optional point within each cleaning target area as a representative point, and taking the cleaning target area, of which the distance between the representative point in the person-present cleaning target area and the representative point in the cleaning target area is the longest of all cleaning target areas, to be the cleanable area farthest from the person-present cleaning target area. Another example is an arrangement where the cleanable area that has the greatest number of cleaning target areas between the person-present cleaning target area and itself is the cleanable area farthest from the person-present cleaning target area.

A method for deciding the cleanable area farthest from the multiple person-present cleaning target area may be any method for deciding, in cases where there are multiple person-present cleaning target areas, as well. For example, in a case where there are a first person-present cleaning target area and a second person-present cleaning target area, the cleanable area that is the farthest from the two person-present cleaning target areas may be the cleanable area that has the longest average distance of the distance from the first person-present cleaning target area and distance from the second person-present cleaning target area. As another example, an arrangement may be made in a case where there are a first person-present cleaning target area and a second person-present cleaning target area, the shortest distances between the first person-present cleaning target area and the second person-present cleaning target area to each cleanable area is calculated, and the cleanable area that has the longest calculated distance is taken as the cleanable area farthest from two of the person-present cleaning target areas.

As a second example of a standard for selection, the cleaner allocation unit 125 may select the cleanable area closest to the current position of the autonomous cleaner 2 out of the multiple cleanable areas. That is to say, the communication control unit 122 obtains position information indicating the current position of the autonomous cleaner 2, from the autonomous cleaner 2. In a case where multiple cleanable areas have been identified as cleanable areas, the cleaner allocation unit 125 outputs cleaning instruction information for the autonomous cleaner 2 to clean the cleanable area closest to the current position of the autonomous cleaner 2, out of the multiple cleanable areas, based on the obtained position information.

In the case of the second example of a standard for selection, the traveling time to the cleanable area is short since the autonomous cleaner 2 is made to clean the cleanable area that is closest from the current position of the autonomous cleaner 2, so the time required to travel can be suppressed. Since cleanable areas change from moment to moment in accordance with people coming and going, there is a need to start and complete cleaning as soon as possible once cleaning instruction information is output. Accordingly, the second standard for selection reduces travel time, so cleaning can be completed as quick as possible.

As a third example of a standard for selection, the cleaner allocation unit 125 may select, from the multiple cleanable areas, the cleanable area that has been set as a surrounding cleaning target area from the greatest number of other cleaning target areas. When comparing cleaning target area A10 and cleaning target area A1 in the surrounding area information illustrated in FIG. 4 for example, the cleaning target area A10 is set as being a surrounding cleaning target area from nine other cleaning target areas, while the cleaning target area A1 is set as being a surrounding cleaning target area from four other cleaning target areas, so the cleaning target area A10 will be selected as the cleanable area. In the case of the third example of a standard for selection, the autonomous cleaner 2 can be made to clean the cleanable area that has the greatest probability of becoming unable to be cleaned due to the presence of people in other cleaning target areas, with priority.

Now, the position information of the autonomous cleaner 2 can be comprehended, by the autonomous cleaner 2 identifying at which position in the floor plan information it is, based on the floor plan information that the autonomous cleaner 2 has and information obtained from the sensor unit 21. For example, the positions of obstacles around the autonomous cleaner 2 can be identified by obstacle sensors or collision sensors included in the sensor unit 21 of the autonomous cleaner 2, and thus at which position in the floor plan information that the autonomous cleaner 2 currently is can be identified, from the identified position of the obstacle. Alternatively, in a case where the initial position of the autonomous cleaner 2, such as the position of a charging device or the like, is included in the floor plan information beforehand, at which position in the floor plan information that the autonomous cleaner 2 currently is can be identified by measuring how far a distance the autonomous cleaner 2 has traveled in which direction from the initial position. Which direction the autonomous cleaner 2 has moved in can be identified by a gyro sensor. Also, how far the autonomous cleaner 2 has traveled can be identified by a traveling sensor.

Also, as a fourth example of a standard for selection, the cleaner allocation unit 125 may select, from the multiple cleanable areas, the cleanable area regarding which the longest amount of time has elapsed since the last cleaning time of day, based on cleaning history information of each cleaning target area. That is too say, the cleaning history storage unit 1304 manages cleaning history of the autonomous cleaner 2 with regard to each of the multiple cleaning target areas. In a case where the multiple cleanable areas have been identified as cleanable areas, the cleaner allocation unit 125 outputs cleaning instruction information for the autonomous cleaner 2, to clean the cleanable area regarding which the longest elapsed time since the last cleaning time of day is included in the cleaning history, out of multiple cleanable areas. In the case of the fourth example of a standard for selection, a cleanable area regarding which the longest amount of time has elapsed since the last cleaning time of day out of the multiple cleanable areas, i.e., the cleanable area where the most dust has conceivably accumulated, is cleaned first with priority.

In a case where the number of autonomous cleaners 2 is smaller than the number of cleanable areas, the cleaner allocation unit 125 may allocate one autonomous cleaner 2 to multiple cleanable areas, to clean the multiple cleanable areas in order. According to this configuration, the autonomous cleaner 2 can comprehend the cleanable area to clean next beforehand, so a cleaning plan to clean the current cleanable area so as to efficiently travel to the next cleanable area can be made.

Also, in this configuration, in a case where a new guest arrives and a cleanable area that had been planned to be cleaned next is no longer cleanable, the cleaner allocation unit 125 may change the cleaning plan, and transmit cleaning instruction information to the autonomous cleaner 2 including the changed cleaning plan. Also, in a case where guests leave, the number of cleanable areas increases, so the cleaner allocation unit 125 may change the cleaning plan from cleaning successively in order starting from the cleanable area currently being cleaned, in order to clean more efficiently, and transmit the changed cleaning plan to the autonomous cleaner 2.

According to the above configuration, in a situation where there are multiple cleaning target areas, cleaning target areas excluding person-present cleaning target areas where people are present and surrounding cleaning target areas around the person-present cleaning target areas can be decided to be cleanable areas, autonomous cleaners 2 can be assigned to the decided cleanable areas, and the autonomous cleaners 2 can be made to clean the cleanable areas.

Although judgment regarding whether or not a person is present is performed based on the order information of the portable data terminal 4 and the payment information of the POS cash register 3 in the first embodiment, this configuration is not restrictive, as long as there is a configuration where judgment can be made whether or not there is a person. For example, a camera may shoot the cleaning target areas, and the person-presence judging unit 123 may judge whether or not there are people by performing pattern matching of people in images shot by the camera. Alternatively, human sensors such as infrared sensors may be installed in the cleaning target areas, with the person-presence judging unit 123 judging whether or not a person is present based on information from the human sensors. Further, pressure sensors may be installed in the seat faces of seats at the tables, and the person-presence judging unit 123 may judge whether or not a person is present based on information from the pressure sensors. Moreover, these technologies may be combined for the person-presence judging unit 123 to judge whether or not a person is present.

Note that description has been made in the first embodiment regarding a configuration where the management device 1 is outside of the eatery 10. However, the same advantages can be obtained by a configuration where the management device 1 is inside the eatery 10 as well.

The timing at which the management device 1 performs the above-described processing in the first embodiment is not describe in particular, but preferably is in a time zone where customer traffic is light in a case of an eatery. In a case of performing the above-described processing in a time zone where customer traffic is heavy, a situation may occur where, for example, a cleanable area is temporarily decided and an autonomous cleaner 2 is allocated to the decided cleanable area, but guests arrive frequently while the autonomous cleaner 2 is cleaning the cleanable area that has been decided, so guests must be shown to a table in a cleanable area where the autonomous cleaner 2 is cleaning. In this case, excess work of interrupting the cleaning by the autonomous cleaner 2, and retracting the autonomous cleaner 2 occurs, so the above-described processing preferably is performed in a time zone where customer traffic is light.

A time zone where customer traffic is light may be automatically calculated by accumulating order information or payment information, which are information relating to customer traffic, at the management device 1, and statistically processing the accumulated information, for example. A configuration also may be made where the management device 1 is accessed from a terminal that a manger or the like has, and set the time zone to perform the above processing from the terminal. Alternatively, an instruction to perform the above processing may be transmitted from a terminal that a manager or the like has to the management device 1, with the management device 1 performing the above processing at the timing of having received this instruction.

In a case of an eatery where the percentage of person-present cleaning target areas where guests are present out of all cleaning target areas is small, the management device 1 preferably performs the above processing. In a case where the percentage of person-present cleaning target areas where guests are present is great, a situation may occur where a cleanable area is decided and an autonomous cleaner 2 is made to travel to the decided cleanable area to clean, but new guests arrive frequently, so guests must be shown to a table in a cleanable area where the autonomous cleaner 2 is cleaning. In this case, the cleaning by the autonomous cleaner 2 needs to be interrupted, so the above processing preferably is performed only in cases where the percentage of person-present cleaning target areas where guests are present out of all cleaning target areas is smaller than a predetermined threshold value. Now, this predetermined threshold value is not uniformly decidable, due to differences in layouts, table arrangements, and so forth of eateries, and accordingly preferably is settable by the user.

A configuration has been described in the first embodiment where all cleaning target areas from which person-present cleaning target areas where people are present and surrounding cleaning target areas around the person-present cleaning target areas are excluded are decided to be cleanable areas, autonomous cleaners 2 are allocated to the decided cleanable areas, and the autonomous cleaners 2 clean the cleanable areas. However, an arrangement may be made where multiple cleaning target areas are grouped, person-present cleaning target areas and surrounding cleaning target areas around the person-present cleaning target areas are identified for each group, and autonomous cleaners 2 are made to travel to and clean cleanable areas from which person-present cleaning target areas and surrounding cleaning target areas have been excluded. According to this configuration, in a case where cleaning is to be performed independently by section, grouping cleaning target areas in each section enables cleaning to be performed without concern about other sections.

Although the management device 1 causes the autonomous cleaner 2 to clean all of the multiple cleaning target areas in the first embodiment, cleanable areas may be decided by taking into consideration manual cleaning by people. For example, a management terminal (omitted from illustration) that an employee carries in an eatery may notify the management device 1 of cleaning target areas cleaned by the employee or cleaning target areas that are planned to be cleaned by the employee, so the management device 1 can know not to select the notified cleaning target areas as cleanable areas for the autonomous cleaner 2. An arrangement may also be made where, in a case of having been notified from the management terminal the employee carries regarding cleaning target areas that the employee has completed cleaning, the management device 1 can know not to select this cleaning target areas as cleanable areas for the autonomous cleaner 2.

Although an example has been described in the first embodiment where one autonomous cleaner 2 is present, multiple autonomous cleaners 2 may be present. Accordingly, in a case where there are multiple cleanable areas, each of the multiple autonomous cleaners 2 can be allocated to the multiple cleanable areas, respectively.

The cleaner allocation unit 125 may also allocate multiple autonomous cleaners 2 to one cleanable area selected by the user. In this case, there needs to be a standard regarding how many autonomous cleaners 2 are to be allocated to the cleanable area, and this standard preferably is settable by a user. As an example of a standard for allocation, the number of autonomous cleaners 2 to be allocated to the cleanable area may be decided based on the area of the cleanable area and the area that an autonomous cleaner 2 can clean on one charge, for example. In the case of this standard, the minimally necessary number of autonomous cleaners 2 to clean one cleanable area can be allocated to one cleanable area. As for another standard, the user may set the number of autonomous cleaners 2 that can be allocated to each cleanable area beforehand, with the cleaner allocation unit 125 deciding the number of autonomous cleaners 2 based on the contents set by the user. In this case, the user can decide the number of autonomous cleaners 2 necessary for each cleanable area beforehand, so the autonomous cleaners 2 can be made to clean in accordance with user preferences.

Also, multiple cleaning target areas may be grouped, with multiple groups formed beforehand. At the time of moving the autonomous cleaner 2 to a cleanable area, the cleaner allocation unit 125 may select one group from the multiple groups based on predetermined conditions, and move the autonomous cleaner 2 into a cleanable area in the selected group. According to this configuration, cleaning can be concentrated on cleaning target areas in a certain range. In a case of an eatery, the eatery can be sectioned into a range where guests are seated and a range that is being cleaned. One conceivable condition of the predetermined conditions for selecting a group is to, for example, select a group that has the greatest number of cleanable areas. In the case of this condition, a group that has the greatest number of cleanable areas can be selected, so cleaning can be performed efficiently.

Note that in the first embodiment, in a case where a cleanable area that the autonomous cleaner 2 is currently cleaning transitions to either a person-present cleaning target area where a person is present, or a surrounding cleaning target area around a person-present cleaning target area while the autonomous cleaner 2 is cleaning, the management device 1 may interrupt the cleaning by the autonomous cleaner 2 and cause the autonomous cleaner 2 to move to the other cleanable area and clean, or to return to its initial position. This configuration can prevent people from becoming uncomfortable.

Figure 12:
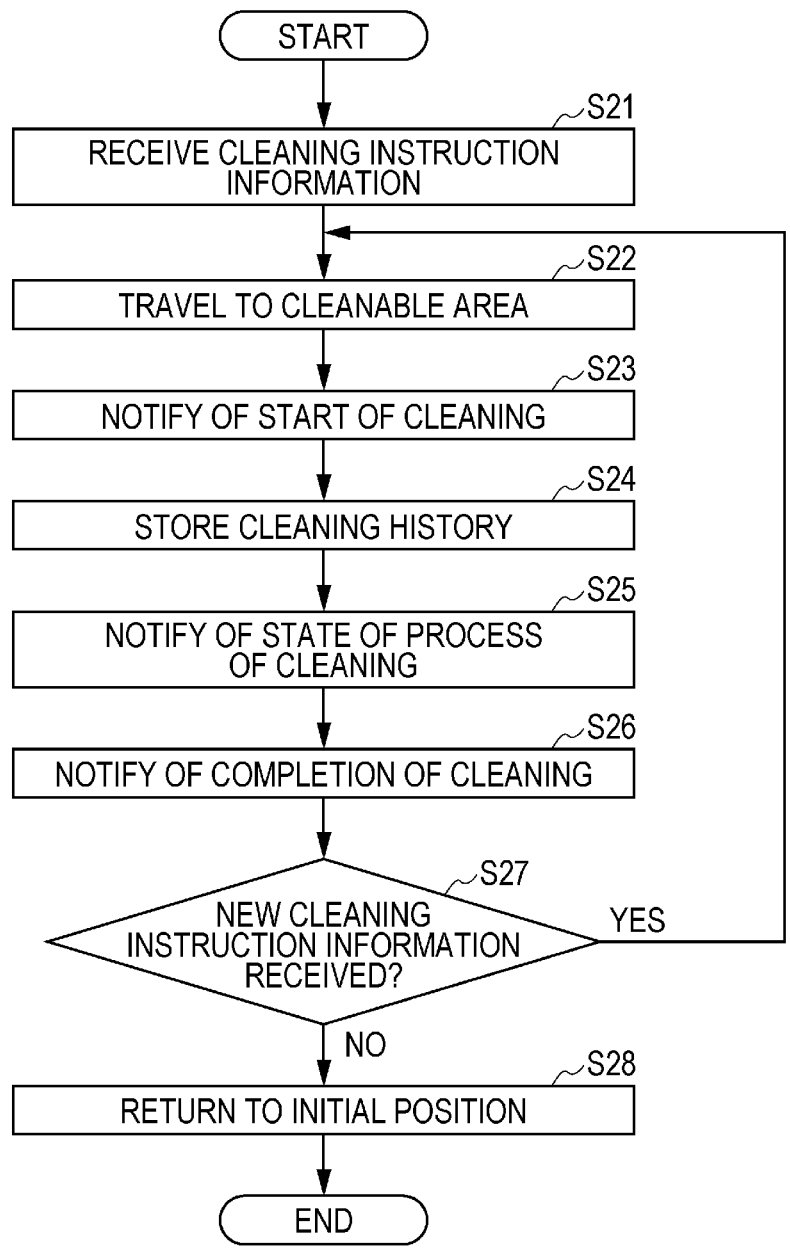
FIG. 12 is a flowchart for describing processing of the autonomous cleaner according to the first embodiment.

Next, processing of the autonomous cleaner 2 in a case of having received cleaning instruction information from the management device 1 will be described in detail with reference to the flowchart in FIG. 12. FIG. 12 is a flowchart for describing processing of the autonomous cleaner 2 according to the first embodiment.

First, the communication unit 25 of the autonomous cleaner 2 receives cleaning instruction information instructing cleaning of a cleanable area from the management device 1 (step S21). The communication control unit 263 stores the information of the cleanable area included in the received cleaning instruction information, in the cleanable area allocation information storage unit 275.

Next, the travel control unit 262 causes the autonomous cleaner 2 to travel to the cleanable area, based on the information stored in the cleanable area allocation information storage unit 275 and the information stored in the cleaning target area storage unit 274 (step S22).

The traveling method of the autonomous cleaner 2 traveling to the cleanable area specified in the cleaning instruction information is for the autonomous cleaner 2 to, for example, store beforehand a travel route from the initial position of the autonomous cleaner 2, such as the position of a charging device or the like, to each cleaning target area, and the travel control unit 262 to cause the autonomous cleaner 2 to travel to the cleanable area based on the stored travel route. For example, the central control unit 261 sets the autonomous cleaner 2 to a remotely-operated operating mode, a manager performs remote operation of the autonomous cleaner 2 from a manager terminal that the manager or the like has, and the route from the initial position to each cleaning target area that the autonomous cleaner 2 has moved is stored in the storage unit 27 as travel path information.

As for another travel method, the travel control unit 262 may cause the autonomous cleaner 2 to travel, while comprehending at what position in the floor plan information that the autonomous cleaner 2 currently is, based on information indicating the cleaning target areas set to the floor plan information, which is stored in the cleaning target area storage unit 274 of the autonomous cleaner 2, and sensor information obtained by the sensor unit 21 of the autonomous cleaner 2. For example, the travel control unit 262 identifies the positions of obstacles around the autonomous cleaner 2 by obstacle sensors or collision sensors included in the sensor unit 21 of the autonomous cleaner 2, and thus can identify, from the identified obstacle, at what position in the floor plan information that the autonomous cleaner 2 currently is. Alternatively, in a case where the initial position of the autonomous cleaner 2, such as the position of a charging device or the like, is included in the floor plan information beforehand, the travel control unit 262 can identify at what position in the floor plan information that the autonomous cleaner 2 currently is, by comprehending how far a distance the autonomous cleaner 2 has traveled in what direction from the initial position. Which direction the autonomous cleaner 2 has moved in can be identified by a gyro sensor. Also, how far the autonomous cleaner 2 has traveled can be identified by a traveling sensor.

As another traveling method, the cleaning instruction information transmitted from the management device 1 may include route information, and the travel control unit 262 may cause the autonomous cleaner 2 to travel based on the received cleaning instruction information. Upon arriving at the cleanable area, the autonomous cleaner 2 begins cleaning.

Next, at the time of the autonomous cleaner 2 starting cleaning, the communication unit 25 of the autonomous cleaner 2 notifies the management device 1 that it will start cleaning of the cleanable area (step S23).

Next, the central control unit 261 of the autonomous cleaner 2 stores cleaning history in the cleaning history storage unit 276 while cleaning (step S24). An example of cleaning history is information where the travel route that the autonomous cleaner 2 has traveled is superimposed on map information of the cleaning target area.

The communication unit 25 of the autonomous cleaner 2 then notifies the management device 1 regarding the state of progress of cleaning, either periodically or in accordance with the degree of progress of cleaning (step S25).

Upon the cleaning of the cleanable area being completed, the communication unit 25 of the autonomous cleaner 2 then notifies the management device 1 that cleaning of the cleanable area has been completed (step S26). Upon having received the notification to the effect that cleaning has been completed from the autonomous cleaner 2, the management device 1 re-decides the cleanable areas at that point. In a case where there is a cleanable area regarding which cleaning has not been completed yet in the decided cleanable areas, the management device 1 decides that cleanable area to be a new cleanable area, and transmits cleaning instruction information to the autonomous cleaner 2 to clean the new cleanable area. On the other hand, in a case where there is no cleanable area in the decided cleanable areas regarding which cleaning has not been completed yet, the management device 1 transmits return instruction information to the autonomous cleaner 2, to return to its home position, which is the initial position.

Next, the communication control unit 263 judges whether or not new cleaning instruction information that instructs cleaning of a new cleanable area has been received from the management device 1 (step S27). In a case where judgment is made that new cleaning instruction information has been received (YES in step S27), the flow returns to the processing in step S22, and the travel control unit 262 of the autonomous cleaner 2 causes the autonomous cleaner 2 to travel to the new cleanable area and start cleaning.

On the other hand, in a case where judgment is made that new cleaning instruction information has not been received, i.e., that return instruction information has been received (NO in step S27), the travel control unit 262 of the autonomous cleaner 2 causes the autonomous cleaner 2 to return to the initial position (step S28). According to the above-described processing, the autonomous cleaner 2 can perform cleaning following cleaning instruction information received from the management device 1.

Note that the management device 1 according to the present embodiment transmits return instruction information to return the autonomous cleaner 2 to the initial position, in a case where there is no cleanable area regarding which cleaning has not been completed yet, but the present disclosure is not restricted to this in particular. The management device 1 may specify a temporary standby position, and transmit standby instruction information to the autonomous cleaner 2 to cause the autonomous cleaner 2 to travel to the standby position and to stand by. In a case where distance from the cleanable area where the autonomous cleaner 2 has completed cleaning to the initial position is far, returning the autonomous cleaner 2 to the initial position is inefficient. However, according to this configuration, if there is a cleaning target area that is not cleanable at the present point but cleaning thereof has not been completed near the cleanable area where the autonomous cleaner 2 has completed cleaning, the autonomous cleaner 2 may stand by at a standby position near the current position. Then, when the cleaning target area regarding which cleaning has not been completed is decided to be a new cleanable area, the autonomous cleaner 2 can travel from the standby position to the cleanable area, and thereby reduce the amount of time necessary for traveling. Note that the standby position may be a standby area set beforehand, or may be one cleaning target area selected according to predetermined conditions from at least one cleaning target area where there are no people.

Second Embodiment

Description will be made in a second embodiment regarding an arrangement where there are multiple cleaning target areas. In this arrangement, cleaning target areas from which person-present cleaning target areas where people are present and surrounding cleaning target areas around the person-present cleaning target areas are excluded are decided to be cleanable areas, and the autonomous cleaner 2 is caused to travel to the decided cleanable areas and perform cleaning in a time zone specified beforehand. In doing so, the surrounding cleaning target areas of cleaning target areas are changed in accordance with remaining time until an end time of the predetermined time zone, the method of which will be described in the second embodiment.

In a case of cleaning an eatery that is open 24 hours using an autonomous cleaner 2, for example, the autonomous cleaner 2 preferably is not used to clean in a time zone when customer traffic is heavy, but rather in a time zone when customer traffic is light. There is demand, regarding cases of cleaning using the autonomous cleaner 2 in a time zone specified beforehand, for being able to clean a maximally broad range within the time constraint of the time zone specified beforehand, by maximally narrowing the surrounding cleaning target areas around the person-present cleaning target areas to increase the number of cleanable areas. On the other hand, there also is demand to maximally broaden the surrounding cleaning target areas for cleaning around the person-present cleaning target areas, in order to minimize the possibility of causing guests discomfort. These two are in a trade-off relationship.

In a case of cleaning using the autonomous cleaner 2 in a time zone specified beforehand, all of the multiple cleaning target areas will be in an uncleaned state, so even if the surrounding cleaning target areas around person-present cleaning target areas where people are present is set broadly, there is a high probability that a cleanable area will be found. However, as time goes on, the number of cleaning target areas that the autonomous cleaner 2 has cleaned will increase, so leaving the surrounding cleaning target areas around person-present cleaning target areas in a broad state will reduce the number of selectable cleanable areas, and eventually there may be no cleanable area left to be found. Accordingly, there is need to narrow the surrounding cleaning target areas that had been broadened as time passes, so that cleanable areas can be found and as many cleaning target areas as possible be cleaned. At this time, the surrounding cleaning target areas need to be narrowed to a degree where people do not feel uncomfortable.

Accordingly, a method will be described in the second embodiment where, in a case that there are multiple cleaning target areas, cleaning target areas from which person-present cleaning target areas where people are present and surrounding cleaning target areas around the person-present cleaning target areas are excluded are decided to be cleanable areas, and the autonomous cleaner 2 is caused to travel to the decided cleanable areas and perform cleaning in a time zone specified beforehand, the surrounding cleaning target areas of cleaning target areas are changed in accordance with remaining time until the end time of the predetermined time zone. According to this method, a maximally broad range is cleaned while preventing guests from feeling uncomfortable.

Figure 2:
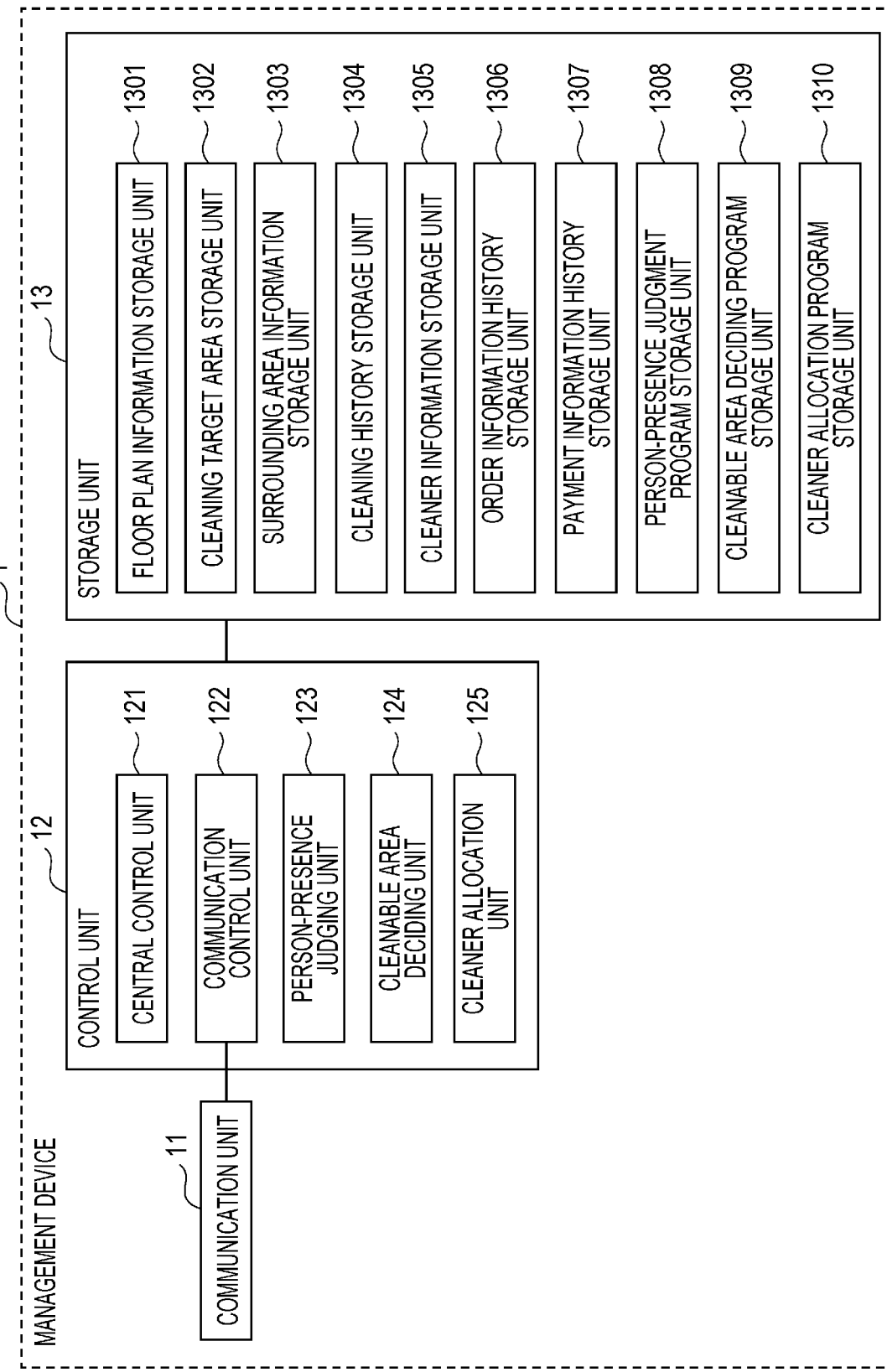
FIG. 2 is a block diagram illustrating the configuration of a management device in the first embodiment.
Figure 13:
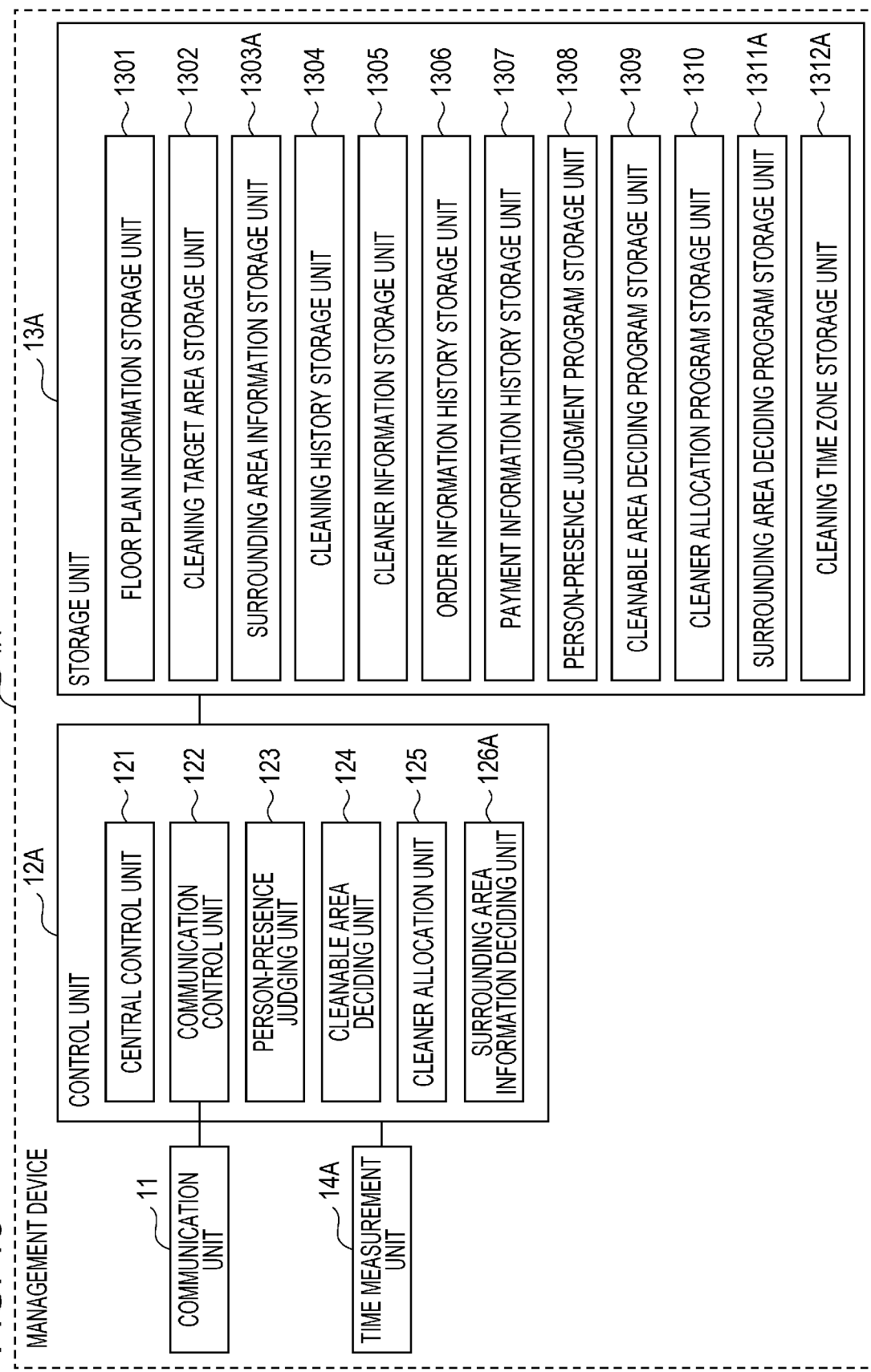
FIG. 13 is a block diagram illustrating the functional configuration of a management device in a second embodiment.

FIG. 13 is a block diagram illustrating the functional configuration of a management device according to the second embodiment. Components in FIG. 13 that are the same as those in FIG. 2 are denoted with the same reference symbols, and detailed description will be omitted. A management device 1A illustrated in FIG. 13 differs from the management device 1 illustrated in FIG. 2 with regard to a time measuring unit 14A, a control unit 12A, and a storage unit 13A.

The time measurement unit 14A measures time. The time measured by the time measurement unit 14A is used to determine whether the current time of day is in the time zone specified by the user beforehand, to cause the autonomous cleaner 2 to perform cleaning, for example.

The control unit 12A differs from the control unit 12 in the management device 1 in FIG. 2 with regard to a surrounding area information deciding unit 126A. The surrounding area information deciding unit 126A decides one surrounding area information set from multiple surrounding area information sets stored in a surrounding area information storage unit 1303A, based on predetermined conditions. In the second embodiment, the surrounding area information storage unit 1303A stores multiple surrounding area information sets generated in accordance with the remaining time from the current time of day to the end time of the time zone specified by the user beforehand. The surrounding area information deciding unit 126A decides one surrounding area information set from the multiple surrounding area information sets stored in the surrounding area information storage unit 1303A, in accordance with the remaining time from the current time of day to the end time of the time zone specified by the user beforehand. The cleanable area deciding unit 124 decides surrounding cleaning target areas of a person-present cleaning target area identified based on the one surrounding area information set decided by the surrounding area information deciding unit 126A.

The storage unit 13A differs from the storage unit 13 of the management device 1 illustrated in FIG. 2 with regard to the surrounding area information storage unit 1303A, a surrounding area deciding program storage unit 1311A, and a cleaning time zone storage unit 1312A. The surrounding area information storage unit 1303A stores multiple surrounding area information sets, where surrounding cleaning target areas are correlated to the cleaning target areas, in accordance with the remaining time from the current time of day to the end time of the time zone specified by the user beforehand. FIGS. 14 and 15 are diagrams illustrating examples of surrounding area information stored in the surrounding area information storage unit 1303A. FIG. 14 is a diagram illustrating an example of first surrounding area information used in a case where the remaining time from the current time of day to the end time of the time zone specified beforehand is 30 minutes or more in the second embodiment, and FIG. 15 is a diagram illustrating an example of second surrounding area information used in a case where the remaining time from the current time of day to the end time of the time zone specified beforehand is less than 30 minutes in the second embodiment.

The first surrounding area information illustrated in FIG. 14 is generated using a rule that cleaning target areas adjacent to each cleaning target area are surrounding cleaning target areas. The second surrounding area information illustrated in FIG. 15 is generated using a rule that of cleaning target areas adjacent to each cleaning target area, cleaning target areas of which a boundary in contact with this cleaning target area is a predetermined length or more are surrounding cleaning target areas. Note that the surrounding area information may be generated based on other rules as well.

For example, in the case of the rule illustrated in FIG. 5 where cleaning target areas overlapping a circular area a predetermined distance from the center point of a table in a cleaning target area are surrounding cleaning target areas, the surrounding cleaning target areas for when the remaining time from the current time of day until the end time of the time zone specified beforehand is 30 minutes or more may be selected using a first circular area, and the surrounding cleaning target areas for when the remaining time from the current time of day until the end time of the time zone specified beforehand is less than 30 minutes may be selected using a second circular area (where first circular area>second circular area). Alternatively, the surrounding area information may be generated by the user setting surrounding cleaning target areas using a user terminal or the like, instead of the surrounding cleaning target areas being generated using predetermined rules. Further, surrounding cleaning target areas generated by predetermined rules may be correctable by the user using a user terminal or the like.

The surrounding area deciding program storage unit 1311A is a program for deciding surrounding area information, and is executed by the surrounding area information deciding unit 126A. In the second embodiment, the surrounding area information deciding unit 126A decides one surrounding area information set in accordance with the remaining time from the current time of day to the end time of the time zone specified by the user beforehand, from multiple surrounding area information sets generated in accordance with the remaining time from the current time of day to the end time of the time zone specified by the user beforehand stored in the surrounding area information storage unit 1303A.

The cleaning time zone storage unit 1312A manages cleaning time information indicating the time zone for the autonomous cleaner 2 to perform cleaning, that has been set beforehand. The cleaning time zone storage unit 1312A stores information of a period in which processing is performed where cleaning target areas from which person-present cleaning target areas where people are present and surrounding cleaning target areas around the person-present cleaning target areas are excluded are decided to be cleanable areas, and the autonomous cleaner 2 is caused to travel to the decided cleanable areas and clean. For example, in an eatery that is open 24 hours, in a case of having the autonomous cleaner 2 to not clean in a time zone where customer traffic is heavy but to clean in a time zone where customer traffic is light, the cleaning time zone storage unit 1312A stores in formation of the time zone where customer traffic is light. The time zone stored in the cleaning time zone storage unit 1312A may be settable by the user, for example. Alternatively, the management device 1A may find the number of guests, and the time of day of dining, from the accumulated order information, payment information, and so forth, statistically calculate a time zone where customer traffic is light based on the number of guests and the time of day of dining, and automatically set the calculated time zone. In a case where the current time of day is within the time zone indicated by the cleaning time zone information, the communication unit 11 outputs cleaning instruction information.

Figure 16:
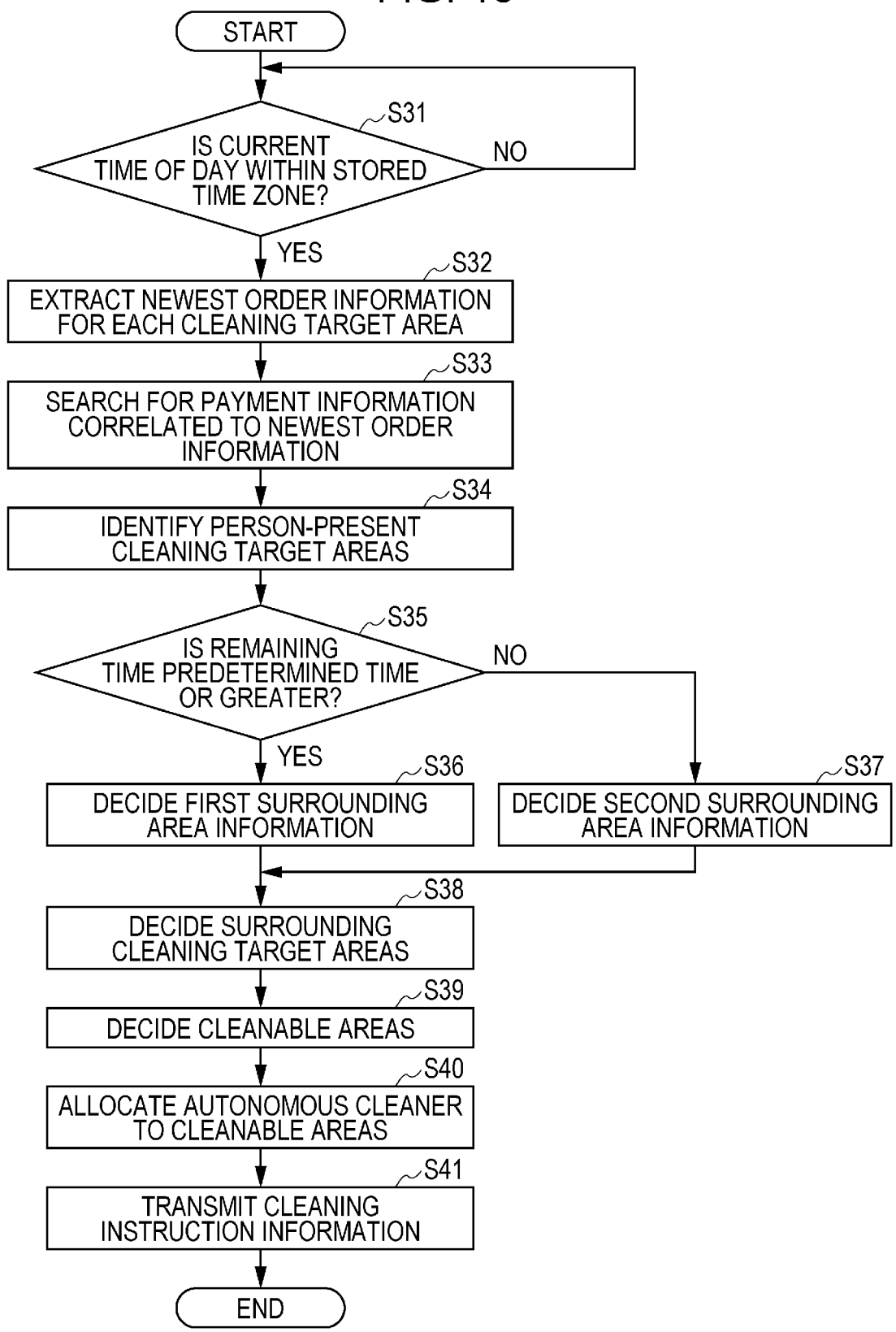
FIG. 16 is a flowchart for describing processing at the management device according to the second embodiment.

Next, operations of the management device 1A configured as described above will be described. FIG. 16 is a flowchart for describing processing of the management device 1A in the second embodiment. The processing of steps S32 through 34 and S38 through 41 in FIG. 16 is the same as steps S1 through S7 in FIG. 10, so detailed description will be omitted. The flowchart illustrated in FIG. 16 differs from the flowchart illustrated in FIG. 10 with regard to the processing in steps S31 and S35 through S37.

In step S31, the central control unit 121 of the management device 1A judges whether or not the current time of day obtained by the time measurement unit 14A is within the time zone stored in the cleaning time zone storage unit 1312A. In a case where judgment is made that the current time of day is not within the time zone stored in the cleaning time zone storage unit 1312A (NO in step S31), the central control unit 121 judges again whether or not the current time of day is within the time zone. The judgment processing in step S31 is loop processing, and is performed periodically.

On the other hand, in a case where judgment is made that the current time of day is within the time zone stored in the cleaning time zone storage unit 1312A (YES in step S31), in step S32 the person-presence judging unit 123 of the management device 1A extracts the newest order information for the tables correlated with the cleaning target areas from the order information stored in the order information history storage unit 1306. Note that the processing in step S32 is the same as the processing of step S1 in FIG. 10, and accordingly description will be omitted.

After person-present cleaning target areas have been identified in step S34, in step S35 the surrounding area information deciding unit 126A calculates the remaining time from the current time of day to the end time of the time zone stored in the cleaning time zone storage unit 1312A, and judges whether the calculated remaining time is a predetermined amount of time or more.

In a case where judgment is made that the remaining time is a predetermined amount of time or more (YES in step S35), in step S36 the surrounding area information deciding unit 126A decides, of the multiple surrounding area information sets stored in the surrounding area information storage unit 1303A, the first surrounding area information correlated with remaining time of a predetermined amount or more. For example, in a case where the predetermined amount of time is 30 minutes, and the remaining amount of time is 30 minutes or more, the surrounding area information deciding unit 126A decides on the first surrounding area information illustrated in FIG. 14, that is correlated with remaining amount of time of 30 minutes or more.

On the other hand, in a case where judgment is made that the remaining time is less than the predetermined amount of time or more (NO in step S35), in step S37 the surrounding area information deciding unit 126A decides, of the multiple surrounding area information sets stored in the surrounding area information storage unit 1303A, the second surrounding area information correlated with remaining time of a less than the predetermined amount. For example, in a case where the predetermined amount of time is 30 minutes, and the remaining amount of time is less than 30 minutes, the surrounding area information deciding unit 126A decides on the second surrounding area information illustrated in FIG. 15, that is correlated with remaining amount of time of 30 minutes or more.

Next, in step S38, the cleanable area deciding unit 124 identifies surrounding cleaning target areas around a person-present cleaning target area based on the first or second surrounding area information decided by the surrounding area information deciding unit 126A in step S36 or step S37. Note that the processing of step S38 and thereafter is the same as the processing of step S4 and thereafter in FIG. 10, so description will be omitted.

According to the above-described processing, in a case that there are multiple cleaning target areas, cleaning target areas from which person-present cleaning target areas where people are present and surrounding cleaning target areas around the person-present cleaning target areas are excluded are decided to be cleanable areas, the autonomous cleaner 2 is allocated to the decided cleanable areas, and the autonomous cleaner 2 cleans the cleanable areas, in a time zone specified beforehand, the surrounding cleaning target areas of cleaning target areas can be changed in accordance with remaining time from the current time of day until the end time of the predetermined time zone. According to this method, a maximally broad range is cleaned while preventing guests from feeling uncomfortable.

Note that in the second embodiment, the management device 1A transmits cleaning instruction information to the autonomous cleaner 2 until the end time of the time zone stored in the cleaning time zone storage unit 1312A, but in a case where determination is made that the end time of the time zone stored in the cleaning time zone storage unit 1312A has arrived, the management device 1A may transmit return instruction information to the autonomous cleaner 2 that is cleaning, to interrupt cleaning and return to the initial position. According to this configuration, the autonomous cleaner 2 can be prevented from cleaning outside of the cleaning time zone. In a case where cleaning by the autonomous cleaner 2 has been interrupted, the central control unit 121 may store the cleanable area, regarding which cleaning was not completed in the time zone indicated in the cleaning time zone information, in the cleaning history storage unit 1304 as a cleaning-incomplete cleaning target area. The cleanable area deciding unit 124 decides, of the multiple cleaning target areas, a cleaning target area that is a cleaning target area other than person-present cleaning target areas and surrounding cleaning target areas, and also corresponds to the cleaning-incomplete cleaning target area, as being a cleanable area. Accordingly, the next time cleaning is performed, the cleanable area deciding unit 124 can decided the cleanable area regarding which cleaning was interrupted the last time to be a cleanable area with priority.

In a case where the processing of the autonomous cleaner 2 returning to the initial position also is to be completed within the time zone stored in the cleaning time zone storage unit 1312A, the cleaner allocation unit 125 may transmit the return instruction information for returning to the initial position before the end time of the time zone, taking into consideration the amount of time it will take for the autonomous cleaner 2 to return to the initial position. According to this configuration, the autonomous cleaner 2 can be kept from traveling outside of the cleaning time zone.

In a case where there is a cleaning target area regarding which cleaning was not completed by the end time of the time zone stored in the cleaning time zone storage unit 1312A in the second embodiment, information relating to the cleaning target area regarding which cleaning was not completed may be stored in the cleaning history storage unit 1304. In a case of judging that the cleaning target area regarding which cleaning was not completed the last time, and information was stored in the cleaning history storage unit 1304, is a cleanable area when performing cleaning the next time, the cleaner allocation unit 125 may allocate the cleaning target area regarding which cleaning was not completed the last time to the autonomous cleaner 2 with priority. According to this configuration, a cleaning target area regarding which cleaning was not completed in the time zone when cleaning the last time, and more dust can be expected to be accumulated, can be cleaned with priority.

In a case where there is a cleaning target area regarding which cleaning was not completed by the end time of the time zone stored in the cleaning time zone storage unit 1312A, the communication control unit 122 may notify the cleaning target area regarding which cleaning was not completed to a terminal device or the like that an employee manages. According to this configuration, the employee can comprehend that there has been a cleaning target area regarding which cleaning by the autonomous cleaner 2 was not completed by the end time of the time zone, and the employee can take measures to clean the cleaning target area regarding which cleaning was not completed. An example of a conceivable measure that the employee can take is to clean the cleaning target area regarding which cleaning was not completed him/herself. Another measure that the employee can take is to transmit cleaning instruction information to the autonomous cleaner 2 to clean the cleaning target area regarding which cleaning was not completed, at a time other than the time zone stored in the cleaning time zone storage unit 1312A, from a management terminal that the employee has or the management device 1A, so that the autonomous cleaner 2 will be perform cleaning.

Now in the present embodiment, in a case where surrounding cleaning target areas have been narrowed down, so there is a cleaning target area that has newly become a cleanable area, and the autonomous cleaner 2 is to be caused to travel to and clean this new cleaning target area, the communication control unit 122 of the management device 1A may notify a management terminal that the employee manages regarding the cleaning target area that has newly become a cleanable area. According to this configuration, the employee can take measures to make sure that guests do not feel uncomfortable, such as placing a partition at a boundary between the cleaning target area that has newly become a cleanable area due to the surrounding cleaning target areas being narrowed down, and the person-present cleaning target area where guests are. The timing of the management device 1A notifying the management terminal preferably is before transmitting cleaning instruction information to the autonomous cleaner 2, since there are cases where the employee will take measures.

Also, an arrangement may be made where, in a case of surrounding cleaning target areas having been narrowed down, and there is a cleaning target area that has newly become a cleanable area to which the autonomous cleaner 2 is to be caused to travel to and clean, the management device 1A may notify a management terminal that an employee manages that the autonomous cleaner 2 will be caused to travel to the new cleanable area, and await a response of acceptance from the employee before transmitting a cleaning instruction information to the autonomous cleaner 2. According to this configuration, whether or not to transmit the cleaning instruction information to the autonomous cleaner 2 can be decided based on judgment of the employee. For example, before cleaning a cleaning target area that has newly become a cleanable area surrounding cleaning target areas having been narrowed down, using the autonomous cleaner 2, the employee may ask diners for their permission to clean using the autonomous cleaner 2, and in a case where the diners consent, transmit a notification of acceptance from the management terminal of the employee to the management device 1A. Only in a case where the management device 1A has received the notification of acceptance can the cleaning instruction information be transmitted to the autonomous cleaner 2 and be made to clean.

Although an example has been described regarding the second embodiment where two types of surrounding area information are stored in the surrounding area information storage unit 1303A in accordance with the remaining time from the current time of day to the end time of the time zone specified beforehand, three or more types of surrounding area information may be stored in the surrounding area information storage unit 1303A in accordance with the remaining time. According to this configuration, surrounding cleaning target areas can be decided with more detail. Further, although in the second embodiment two types of surrounding area information are stored in the surrounding area information storage unit 1303A beforehand, the present disclosure is not restricted to this in particular. An arrangement may be made where the surrounding area information storage unit 1303A only stores one type of surrounding area information, and in a case of judging that the remaining time is less than the predetermined amount of time, the cleanable area deciding unit 124 may calculate the surrounding cleaning target areas from surrounding area information stored in the surrounding area information storage unit 1303A.

Although an arrangement is in the second embodiment where the surrounding cleaning target areas are changed in accordance with the remaining time from the current time of day until the end time of the cleaning time zone stored in the cleaning time zone storage unit 1312A, an arrangement may be made where the surrounding cleaning target areas are changed when the percentage of cleaning target areas where cleaning has been completed as to all cleaning target areas reaches a certain percentage. According to this configuration, the surrounding cleaning target areas are changed in accordance with the degree of progress of cleaning, so cleaning can be performed without concern of the current time of day.

In a case where the management device 1A is not able to decide a cleanable area, the surrounding cleaning target areas may be changed. According to this configuration, in a case where a cleanable area cannot be decided, the probability that a cleanable area will be newly decidable rises immediately, and cleaning can be efficiently performed.

Although the surrounding cleaning target areas are changed in the second embodiment in accordance with the remaining time from the current time of day to the end time of the time zone stored in the cleaning time zone storage unit 1312A, the surrounding cleaning target areas may be changed in accordance with the stay time of people present in person-present cleaning target areas. According to this configuration, in an eatery for example, the surrounding cleaning target areas can be broadened during a period it can be estimated that guests are dining, and the surrounding cleaning target areas can be narrowed during a period it can be estimated that guests have finished dining. Accordingly, the surrounding cleaning target areas can be broadened while guests are dining, and accordingly the likelihood of dust flying while dining can be further reduced. Note that the stay time of guests in a cleaning target area, for example, can be calculated by measuring time from the time of day at which the portable data terminal 4 first has taken an order, to the current time of day. Note that since this configuration estimates periods when guests are dining and periods when guests are not dining, the surrounding cleaning target areas are preferably changed not based on the stay time from the time of day at which the first order was taken to the current time of day, but on the stay time from the time of day at which the last order was taken to the current time of day. Now, the period in which guests can be estimated to be dining is not uniformly decidable, due to differences in what dishes have been ordered, the amount of time it takes to prepare the dishes that have been ordered and so forth. This further differs depending on circumstances at the eatery. Accordingly, this preferably is settable by the user.

Third Embodiment

In a third embodiment, in addition to the restriction of excluding person-present cleaning target areas where people are present and surrounding cleaning target areas around the person-present cleaning target areas from multiple cleaning target areas, and deciding the remaining cleaning target areas to be cleanable area, a further restriction is added to decide cleanable areas. This restriction is that if a cleanable area is a shared cleaning target area that multiple people use as at least a passage, judgment is made regarding whether or not there are people in a related cleaning target area correlated with the shared cleaning target area beforehand, and the shared cleaning target area is decided to be a cleanable area in a case where there are no people in the related cleaning target area. A method will be made in the third embodiment regarding deciding a cleanable area according to this restriction, and causing the autonomous cleaner 2 to travel to that cleanable area and clean.

In the first embodiment, description has been made regarding an example where cleaning target areas are correlated with tables for dining, and after excluding tables where people are present and tables around the tables where people are present from the multiple tables, the remaining tables are cleaned. In comparison with this, a method will be described in the third embodiment where shared areas shared by multiple people, such as passages, around an entrance, around restrooms, and so forth, are further correlated with cleaning target areas, in addition to the tables in the eatery, and the cleaning target areas are cleaned by the autonomous cleaner 2.

In a case of cleaning a shared area shared by multiple people, such as a passage or entrance or the like, there is a need to avoid inconveniencing people using the shared area. Accordingly, there is a need to clean the shared area in a case where there are no people that might use the shared area. Accordingly, a method of causing the autonomous cleaner 2 to clean cleanable areas will be described in the third embodiment where, in addition to the restriction where cleaning target areas excluding person-present cleaning target area areas where people are present from multiple cleaning target areas, and surrounding cleaning target areas around the person-present cleaning target areas are cleaned as being cleanable area, a further condition is added where a shared area is cleaned as a cleanable area in a case where there are no people that might use the shared area.

Figure 17:
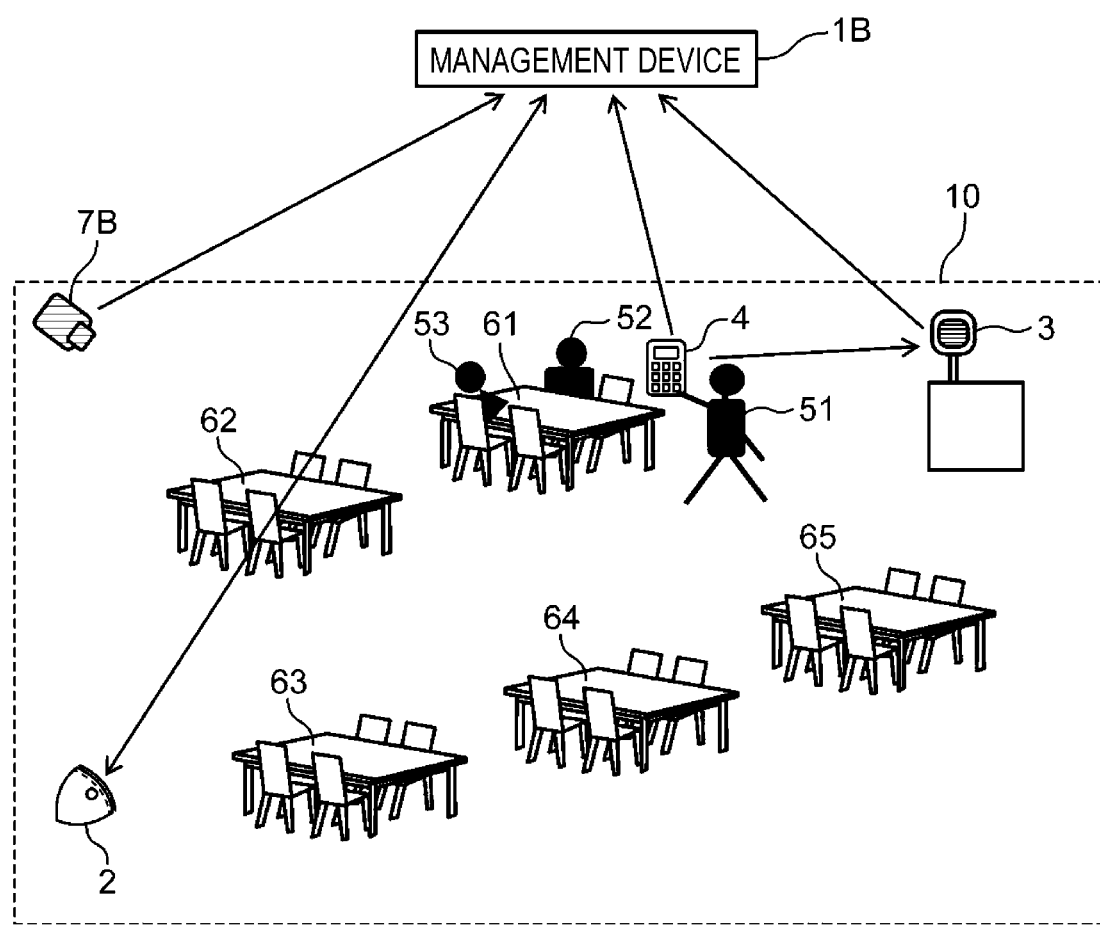
FIG. 17 is a diagram conceptually illustrating an overall image of a cleaning system according to a third embodiment.

FIG. 17 is a diagram conceptually illustrating an overall cleaning system in the third embodiment. Components in FIG. 17 that are the same as those in FIG. 1 are denoted with the same reference symbols, and detailed description will be omitted. The cleaning system illustrated in FIG. 17 differs from the cleaning system illustrated in FIG. 1 with regard to a camera 7B.

The camera 7B takes images of a shared cleaning target area correlated with a shared area shared by multiple people, such as passages, around an entrance, around restrooms, and so forth. The camera 7B transmits the taken images to a management device 1B. The management device 1B judges whether or not there are people in the shared cleaning target area by performing pattern matching of the images received from the camera 7B. Although the cleaning system according to the third embodiment has one camera, multiple cameras may be provided.

Figure 18:
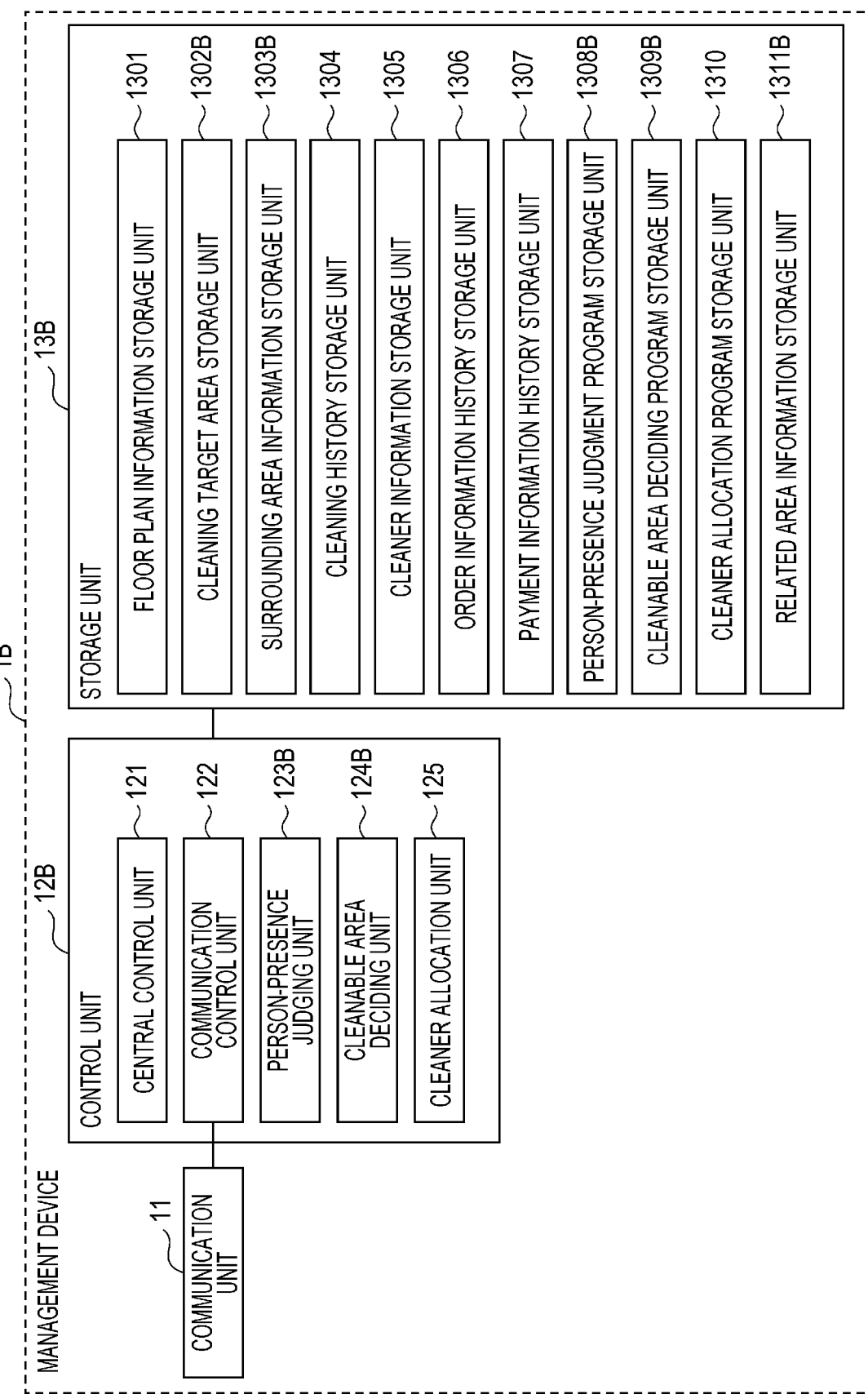
FIG. 18 is a block diagram illustrating the functional configuration of a management device in the third embodiment.

FIG. 18 is a block diagram illustrating the configuration of the management device 1B according to the third embodiment. Components in FIG. 18 that are the same as those in FIG. 2 are denoted with the same reference symbols, and detailed description will be omitted. The management device 1B illustrated in FIG. 18 differs from the management device 1 illustrated in FIG. 2 with regard to a control unit 12B and a storage unit 13B.

The control unit 12B differs from the control unit 12 of the management device 1 illustrated in FIG. 2 with regard to a person-presence judging unit 123B and a cleanable area deciding unit 124B. The person-presence judging unit 123B judges whether or not people are present at each of the multiple cleaning target areas. In addition to tables 61 through 65 in the eatery 10, shared areas such as passages, around an entrance, around restrooms, and so forth, are correlated with cleaning target areas in the third embodiment, so judgment is made regarding whether or not there are people at cleaning target areas correlated with tables and shared cleaning target areas correlated with shared areas. Judgment of whether or not there are people in cleaning target areas correlated with tables is performed in the same way as in the first embodiment, which is to say that the person-presence judging unit 123B extracts the newest order information from order information received from the portable data terminal 4. The person-presence judging unit 123B then judges whether or not order identification information the same as the order identification information included in the extracted order information exists in the payment information received from the POS cash register 3. Accordingly, the person-presence judging unit 123B judges whether or not tables are unoccupied, and based on the judgment results thereof, judges whether or not people are at cleaning target areas correlated with tables.

On the other hand, whether or not there are people in shared cleaning target areas correlated with shared areas cannot be judged from order information and payment information, so another way needs to be used for judgment. In the third embodiment, the communication unit 11 of the management device 1B receives images from the camera 7B installed in the eatery 10, and the person-presence judging unit 123B performs pattern matching for people in the received image information, thereby determining whether or not people are present in shared areas.

Note that the person-presence judging unit 123B may judge whether or not there are people in the shared cleaning target areas correlated with shared areas using other methods. For example, human sensors such as infrared sensors or the like may be installed in the shared areas in the eatery, with the person-presence judging unit 123B judging whether or not people are present in the shared areas based on person-detection information transmitted from the human sensors.

The cleanable area deciding unit 124B decides cleanable areas for each of the cleaning target areas correlated with tables and shared cleaning target areas correlated with shared areas. First, the cleanable area deciding unit 124B decides cleanable areas from the cleaning target areas correlated with tables. In the same way as in the first embodiment, the cleanable area deciding unit 124B identifies person-present cleaning target areas where people are present, which have been judged by the person-presence judging unit 123B, and surrounding cleaning target areas around the person-present cleaning target areas, based on the surrounding area information correlating the cleaning target areas and surrounding cleaning target areas that has been stored beforehand, and then decides cleaning target areas other than the identified person-present cleaning target areas and surrounding cleaning target areas to be cleanable areas.

Next, the cleanable area deciding unit 124B decides cleanable areas from the shared cleaning target areas correlated with shared areas. The cleanable area deciding unit 124B decides whether or not cleanable area decided based on cleaning target areas correlated with tables are shared cleaning target areas correlated with shared areas. In a case where judgment is made that a cleanable area is not a shared cleaning target area correlated with a shared area, the cleanable area deciding unit 124B outputs the decided cleanable area.

On the other hand, in a case where judgment is made that a cleanable area is a shared cleaning target area correlated with a shared area, the cleanable area deciding unit 124B identifies related areas related to the shared cleaning target area, based on information stored in a related area information storage unit 1311B, and decides whether or not there are people in identified related areas. In a case where judgment is made that there are not people in related areas, the cleanable area deciding unit 124B decides this shared cleaning target area to be a cleanable area. On the other hand, in a case where judgment is made that there is a person in a related area, the cleanable area deciding unit 124B does not decide this shared cleaning target area to be a cleanable area.

The cleanable area deciding unit 124B judges whether or not the decided cleanable area is a shared cleaning target area or not, based on related area information correlating beforehand shared cleaning target areas out of the multiple cleaning target areas that are used by multiple people at least as passages, and cleaning target areas other than the shared cleaning target areas relating to the shared cleaning target areas. In a case where a cleanable area that has been decided is judged to be a shared cleaning target area, the cleanable area deciding unit 124B identifies the cleaning target area correlated with a shared cleaning target area as being a related cleaning target area, based on the related area information. The cleanable area deciding unit 124B judges whether or not there is a person in the identified related cleaning target area. In a case where judgment is made that there is nobody in the identified related cleaning target area, the cleanable area deciding unit 124B decides the shared cleaning target area to be a cleanable area.

The storage unit 13B differs from the storage unit 13 of the management device 1 illustrated in FIG. 2 with regard to a cleaning target area storage unit 1302B, a surrounding area information storage unit 1303B, the related area information storage unit 1311B, a person-presence judgment program storage unit 1308B, and a cleanable area deciding program storage unit 1309B.

The cleaning target area storage unit 1302B stores information indicating cleaning target areas set in the floor plan information. Setting of the cleaning target area may be automatically set based on the positions of tables in the floor plan information or on table sizes, or may be set by a user such as the owner or staff of the eatery or the like, for example. In a case of performing settings by a user, cleaning target areas can be set by a user terminal such as a personal computer, tablet computer, smartphone (none illustrated), or the like, of the user obtaining floor plan information from the management device 1B, accepting user input regarding cleaning target areas based on the floor plan information, and transmitting the accepted information regarding cleaning target areas to the management device 1B.

Figure 19:
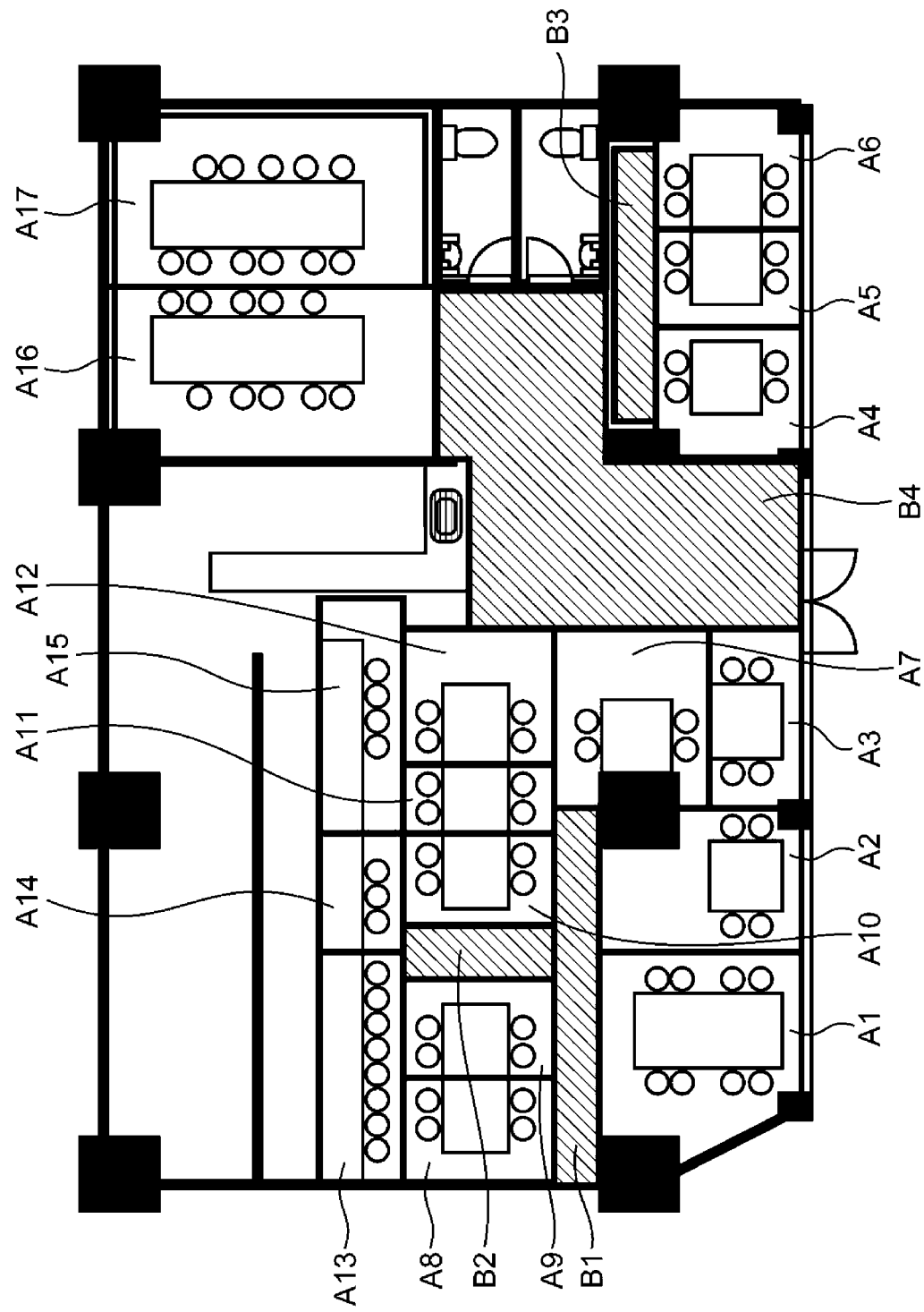
FIG. 19 is a diagram illustrating an example of information stored in a cleaning target area storage unit in the third embodiment.

FIG. 19 is a diagram illustrating an example of information stored in the cleaning target area storage unit 1302B in the third embodiment. Seventeen cleaning target areas A1 through A17 are set in the floor plan of the eatery in FIG. 19, and also four shared cleaning target areas B1 through B4 are set. The cleaning target areas A1 through A17 are set for each of tables in the eatery, and the shared cleaning target areas B1 through B4 are cleaning target areas that have been correlated with shared areas.

The surrounding area information storage unit 1303B stores surrounding area information indicating surrounding cleaning target areas around the cleaning target areas correlated with the tables. The surrounding area information indicating surrounding cleaning target areas of the cleaning target areas may be generated based on predetermined rules, or may be generated by accepting user input.

FIG. 20 is a diagram illustrating an example of surrounding area information stored in the surrounding area information storage unit 1303B in the third embodiment. The surrounding area information illustrated in FIG. 20 is generated based on a rule that cleaning target areas and shared cleaning target areas adjacent to a cleaning target area are surrounding cleaning target areas. The surrounding area information storage unit 1303B stores surrounding area information correlating multiple cleaning target areas and surrounding cleaning target areas beforehand. In FIG. 20, cleaning target areas and shared cleaning target areas adjacent to a cleaning target area are set as surrounding cleaning target areas. For example, correlated with cleaning target area A1 are cleaning target area A2 and shared cleaning target area B1, as surrounding cleaning target areas.

The related area information storage unit 1311B stores related area information indicating related areas related to the shared cleaning target areas correlated with shared areas. The related area information indicating related areas related to the shared cleaning target areas correlated with shared areas may be generated based on a predetermined rule, or may be generated by accepting user input.

FIG. 21 is a diagram illustrating an example of related area information stored in the related area information storage unit 1311B in the present embodiment. In FIG. 21, the related areas of shared cleaning target areas correlated with passages are generated based on a rule where cleaning target areas adjacent to a shared cleaning target area are related areas, and related areas of the shared cleaning target area correlated with the entrance, restrooms, and location where the POS cash register 3 is situated, are generated based on a rule that all cleaning target areas correlated to tables are related areas.

Specifically, in FIG. 21, shared cleaning target areas B1, B2, and B3 are shared cleaning target areas indicating passages, and the related areas of the shared cleaning target areas B1, B2, and B3 are cleaning target areas adjacent to each of the shared cleaning target areas B1, B2, and B3. For example, the related areas of the shared cleaning target area B1 are cleaning target areas A1, A2, A8, A9, A10, A11, A13, and A14. The reason is that there is a high probability that a person present in any of the cleaning target areas A1, A2, A8, A9, A10, A11, A13, and A14 will pass through the shared cleaning target area B1. Also, the shared cleaning target area B4 is a shared cleaning target area indicating the entrance, restrooms, and location where the POS cash register 3 is situated, and the related areas of the shared cleaning target area B4 is all cleaning target areas A1 through A17, correlated to the tables. This is because is that there is a high probability that a person present in any of the cleaning target areas A1 through A17 will pass through the shared cleaning target area B4. Note that the rules for generating related area information are not restricted to the above-described configuration. Related rule information may be generated by any rule.

The person-presence judgment program storage unit 1308B stores a person-presence judgment program that judges whether or not a person is present in a cleaning target area. The person-presence judgment program is executed by the person-presence judging unit 123B.

The cleanable area deciding program storage unit 1309B stores a cleanable area deciding program for deciding, from the cleaning target areas, cleanable areas to which the autonomous cleaner 2 can be made to travel and clean. The cleanable area deciding program is executed by the cleanable area deciding unit 124B.

Figure 22:
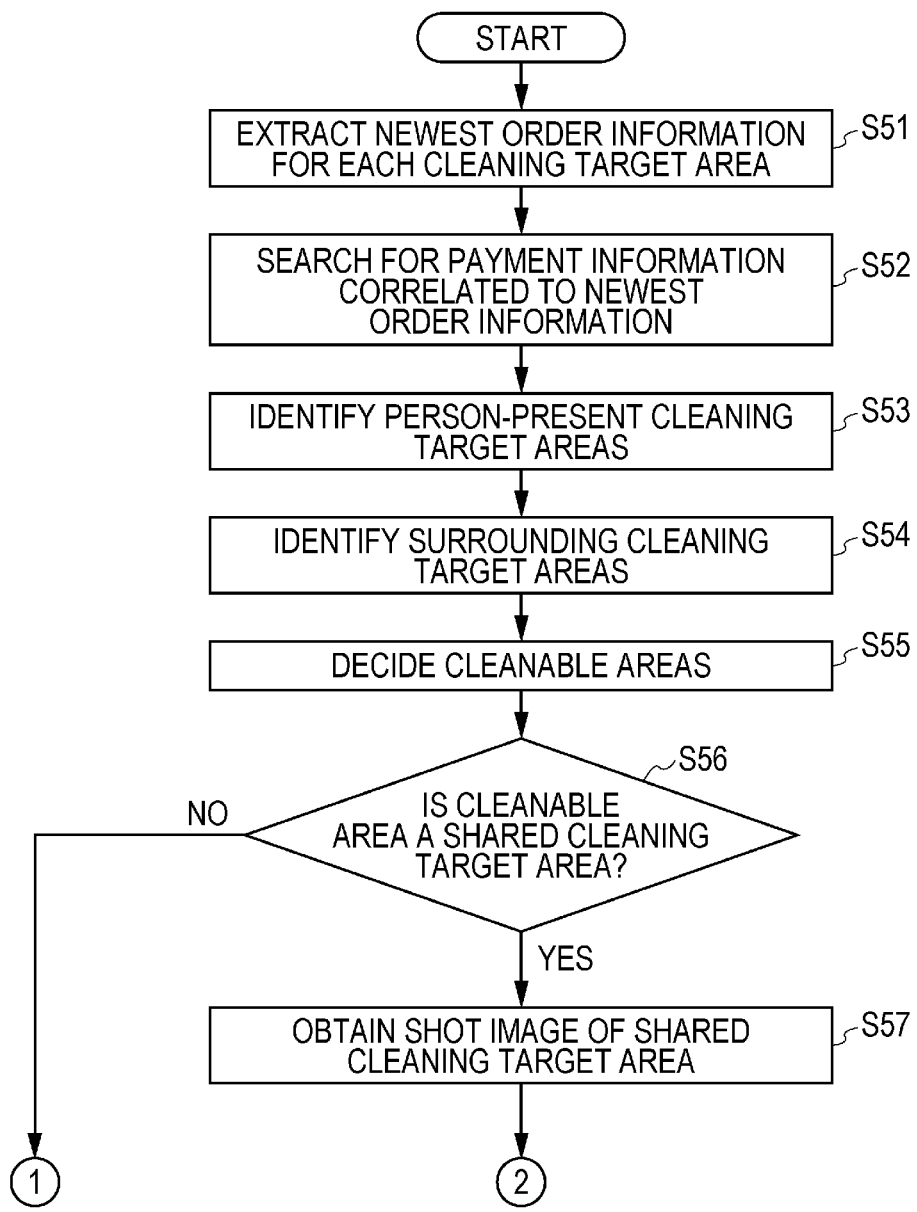
FIG. 22 is a first flowchart for describing processing at the management device according to the third embodiment.

The operations of the management device 1B configured as described above will be described next. FIG. 22 is a first flowchart for describing processing of the management device 1B according to the third embodiment, and FIG. 23 is a second flowchart for describing processing of the management device 1B according to the third embodiment.

The processing of steps S51 through S55, S63, and S64 in FIGS. 22 and 23 is the same as the processing of steps S1 through S7 in FIG. 10, so detailed description will be omitted. The flowcharts in FIGS. 22 and 23 differ from the flowchart in FIG. 10 with regard to the processing of steps S56 through S62.

In the processing of steps S51 through S55, processing the same as in the first embodiment is performed with regard to the cleaning target areas correlated with the tables. The cleanable areas decided in the processing in step S55 are at least one of the cleaning target areas correlated with the tables and the shared cleaning target areas correlated with the shared areas.

Next, in step S56, the cleanable area deciding unit 124B judges whether or not a cleaning target area decided in step S55 is a shared cleaning target area correlated with a shared area. In the processing of step S56, the cleanable area deciding unit 124B can confirm whether or not the cleanable area is a shared cleaning target area, by confirming whether or not the cleanable area matches a shared cleaning target area stored in the related area information storage unit 1311B. In a case where multiple cleanable areas exist, the cleanable area deciding unit 124B decides whether or not each cleanable area is a shared cleaning target area.

In a case where judgment is made that the cleanable area is not a shared cleaning target area correlated with a shared area (NO in step S56), there is no need to change the cleanable area, so the flow transitions to the processing of step S63.

On the other hand, in a case where judgment is made that the cleanable area is a shared cleaning target area correlated with a shared area (YES in step S56), the communication control unit 122 of the management device 1B obtains a shot image taken of the shared cleaning target area from the camera 7B installed in the eatery 10 via the communication unit 11 (step S57).

Next, the person-presence judging unit 123B performs pattern matching of people in the shot image that has been obtained, and thus judges whether or not there is a person in the shared cleaning target area correlated with the shared area (step S58).

In a case where judgment is made that there is a person in the shared cleaning target area (YES in step S58), the cleanable area deciding unit 124B ends the processing without deciding the shared cleaning target area to be cleanable area (step S59), since the cleaning target area that is the shared cleaning target area cannot be cleaned.

On the other hand, in a case where judgment is made that no person is in the shared cleaning target area (NO in step S58), the cleanable area deciding unit 124B identifies related areas correlated with the shared cleaning target area, based on the related area information stored in the related area information storage unit 1311B (step S60).

Next, the cleanable area deciding unit 124B judges whether or not there are people in the identified related areas (step S61). The judgment processing in step S61 is performed by referencing the judgment results of the person-presence judging unit 123B, since whether or not people are present has already been judged by the person-presence judging unit 123B in steps S53 and S58.

Now, in a case where judgment has been made that there are people present in the related areas (YES in step S61), the cleanable area deciding unit 124B ends the processing without deciding the shared cleaning target area to be cleanable area (step S59), since the cleanable area that is the shared cleaning target area cannot be cleaned.

On the other hand, in a case where judgment has been made that there are no people in the related areas (NO in step S61), the cleanable area deciding unit 124B transitions to the processing in step S62, since there is no need to change the cleanable area.

The cleaner allocation unit 125 then allocates the autonomous cleaner 2 to the cleanable area (step S62). The processing in step S62 is the same as that in the first embodiment, so description will be omitted. Note that in a case where a cleaning target area correlated with a table and a shared cleaning target area correlated with a shared area both exist as cleanable areas, the autonomous cleaner 2 may be allocated to both cleanable areas, and be caused to clean both cleanable areas.

According to the processing described above, in addition to the restriction of excluding person-present cleaning target areas where people are present and surrounding cleaning target areas around the person-present cleaning target areas from multiple cleaning target areas, and deciding the remaining cleaning target areas to be cleanable area, a further restriction is added to decide cleanable areas, where if there is a shared cleaning target area that has a related cleaning target area set regarding a cleanable area, the shared cleaning target area is decided to be a cleanable area in a case where the condition is satisfied that there are no people in the related cleaning target area correlated with that shared cleaning target area, and the autonomous cleaner 2 can be made to travel to that cleanable area and clean. According to this configuration, in a case where an eatery, for example, has cleaning target areas correlated with tables, and further shared cleaning target areas correlated with shared areas such as passages, around an entrance, around restrooms, and so forth, around the tables can be cleaned without making guests uncomfortable, and also shared areas can be cleaned without inconveniencing guests.

Note that in the third embodiment, judgment is made regarding whether or not there are people present in a shared cleaning target area that is a shared area, but an arrangement may be made where no judgment is made regarding whether or not there are people present in the shared cleaning target area, simply assuming that there are no people present in the shared cleaning target area. Passages which are shared areas are places where guests temporarily are present but quickly go away. Accordingly, even in a case where a person is detected in a shared area, it is conceivable that the person will soon become undetectable, and the information of detection of the person will not function effectively. Further, guests will stay at their tables the greater part of the time, and it is inconceivable that a guest would stay in a shared area for a long period of time, so it is conceivable that deeming shared areas to have no people present would have no effects.

Note that in a case where there are multiple cleanable areas corresponding to multiple shared cleaning target areas in the third embodiment, the shared cleanable area with the greatest number of related areas correlated thereto may be cleaned with priority. It is conceivable that shared cleaning target areas having a great number of related areas will have a shorter cleanable period as compared to shared cleaning target areas having few related areas. Accordingly, if the shared cleaning target areas having many related areas is cleanable, the shared cleaning target areas can be cleaned in a surer manner by this shared cleaning target area being cleaned with priority.

Now, in a case of having the autonomous cleaner 2 to clean a shared cleaning target area correlated with a shared area in the third embodiment, there is a greater chance of people temporarily appearing in shared cleaning target areas as compared with cleaning target areas correlated with tables. Accordingly, the autonomous cleaner 2 may be provided with an arrangement to output an alarm sound or blinking lights, and to make the alarm sound or blink the lights while cleaning a shared cleaning target area correlated with a shared area. According to this configuration, people passing through the shared cleaning target area correlated with the shared area can be alerted. Further, a human sensor such as an infrared sensor may be provided to the autonomous cleaner 2, and make the alarm sound or blink the lights only when people pass through the shared cleaning target area correlated with the shared area. This configuration enables battery consumption due to output of the alarm sound or blinking lights to be suppressed.

In the first through third embodiments, the components of the management devices 1, 1A, and 1B may be included in any of the autonomous cleaner 2, POS cash register 3, and portable data terminal 4.

Although a control method for an autonomous cleaner according to one or multiple forms of the present disclosure has been described by way of an embodiment, the present disclosure is not restricted to this embodiment. Various modifications that will be conceivable by one skilled in the art, and forms constructed by combining components of different embodiments, without departing from the essence of the present disclosure, may also be encompassed by the scope of one or multiple forms of the present disclosure.

In the above-described embodiment, the components may be configured as dedicated hardware, or may be realized by executing software programs suitable for the components. The components may be realized by a program executing unit such as a CPU or other processor reading out and executing software programs recorded in a recording medium such as a hard disk or semiconductor memory or the like.

All or part of the functions of the management device according to the embodiment of the present disclosure may be realized by large scale integration (LSI) that is typically an integrated circuit. These may be individually formed on signal chips, or part or all may be included on a single chip. Circuit integration is not restricted to LSI, and maybe realized by dedicated circuits or general-purpose processors. Field-programmable gate arrays (FPGA) that can be programmed after manufacturing of the LSI, and reconfigurable processors where connections and settings of circuit cells within the LSI can be reconfigured may also be used.

Also, part or all of the functions of the management device according to the first through third embodiments of the present disclosure may be realized by a processor such as a CPU executing a program.

Note that the numerals used in the above description are all only exemplary to describe the present disclosure in detail, and that the present disclosure is not restricted to the numerals that have been exemplified.

The order in which the steps in FIGS. 10, 12, 16, 22, and 23 are executed is only exemplary to describe the present disclosure in detail, and that orders other than that described above may be used, as long as the same advantages can be obtained. Also, part of the above steps may be executed at the same time (in parallel) with other steps.

Further, various modifications where embodiments of the present disclosure are modified within a scope conceivable by one skilled in the art, without departing from the essence of the present disclosure, are also included in the present disclosure.

The control method of an autonomous cleaner, control device, non-transitory computer-readable recording medium storing a control program, and autonomous cleaner, according to the present disclosure, enables the autonomous cleaner to clean multiple cleaning target areas without making people in the vicinity feel uncomfortable, and is useful as a control method of an autonomous cleaner, control device, non-transitory computer-readable recording medium storing a control program, and autonomous cleaner.

What is claimed is:

1. A control method of a control device having a processor and a memory, and that controls an autonomous cleaner, the method comprising:
   obtaining, by the processor, an electronic floor plan of a predetermined space, the predetermined space being a cleaning range of the autonomous cleaner;
   estimating, by the processor, a person-present position at which a person is present in the predetermined space;
   dividing, by the processor, the predetermined space into a plurality of cleaning target areas to be individually cleaned by the autonomous cleaner;
   identifying, by the processor, a cleaning target area including the person-present position where the person is estimated to be present, among the plurality of cleaning target areas, as a person-present cleaning target area;
   identifying, by the processor, cleaning target areas adjacent to the person-present cleaning target area as surrounding cleaning target areas;
   excluding, by the processor and from the plurality of cleaning target areas, the person-present cleaning target area and the surrounding cleaning target areas from cleaning by the autonomous cleaner; and
   determining, by the processor and among the plurality of cleaning target areas, cleaning target areas other than the person-present cleaning target area and the surrounding cleaning target areas to be cleanable areas,
   wherein at least one unoccupied cleaning target area is present between each of the cleanable areas and the person-present cleaning target area.

2. The control method according to claim 1, further comprising:
   outputting, by the processor, cleaning instruction information to cause the autonomous cleaner to perform a cleaning operation on the cleanable areas.

3. The control method according to claim 1, further comprising:
   identifying, by the processor and among the surrounding cleaning target areas, at least one surrounding cleaning target area that overlaps the identified person-present cleaning target area, based on predetermined surrounding area information that correlates each of the plurality of cleaning target areas.

4. The control method according to claim 1, further comprising:
   identifying, by the processor, the cleaning target areas located within a predetermined range of the person-present position where the person is estimated to be, as the surrounding cleaning target areas.

5. The control method according to claim 1,
   wherein, among the surrounding cleaning target areas, at least one surrounding cleaning target area shares at least one side or one point defining the at least one surrounding cleaning target area with the person-present cleaning target area.

6. A control method of a control device having a processor and a memory, and that controls an autonomous cleaner, the method comprising:
   obtaining, by the processor, an electronic floor plan of a predetermined space, the predetermined space being a cleaning range of the autonomous cleaner;
   estimating, by the processor, a person-present position at which a person is present in the predetermined space;
   dividing, by the processor, the predetermined space into a plurality of cleaning target areas to be individually cleaned by the autonomous cleaner;
   identifying, by the processor, a cleaning target area including the person-present position where the person is estimated to be present, among the plurality of cleaning target areas, as a person-present cleaning target area;
   identifying, by the processor, a cleaning target area around the person-present cleaning target area as a surrounding cleaning target area;
   determining, by the processor and among the plurality of cleaning target areas, cleaning target areas other than the person-present cleaning target area and the surrounding cleaning target area to be cleanable areas;
   outputting, by the processor, cleaning instruction information to cause the autonomous cleaner to perform a cleaning operation on the cleanable areas; and
   outputting, by the processor, when one or more areas of the plurality of cleanable areas have been identified as the cleanable areas, the cleaning instruction information including an instruction to cause the autonomous cleaner to clean a cleanable area, among the cleanable areas, that is located at a position farthest from the person-present cleaning target area.

7. The control method according to claim 2, further comprising:
   outputting, by the processor, when position information indicating a current position of the autonomous cleaner is obtained with respect to the cleanable areas, the cleaning instruction information to cause the autonomous cleaner to clean a cleanable area, among the cleanable areas, that is closest to the current position of the autonomous cleaner.

8. The control method according to claim 2, further comprising:
   managing, by the processor, cleaning history of the autonomous cleaner with regard to each of the plurality of cleaning target areas; and
   outputting, by the processor, the cleaning instruction information to cause the autonomous cleaner to clean a cleanable area, among the cleanable areas, having an earliest cleaning completion time.

9. The control method according to claim 1, further comprising:
   managing, by the processor, cleaning history of the autonomous cleaner with regard to each of the plurality of cleaning target areas;
   re-estimating, by the processor, when a cleaning operation for cleaning the cleanable areas by the autonomous cleaner has been completed, an updated person-present position at which a person is present;
   re-identifying, by the processor, a cleaning target area including the updated person-present position where the person is re-estimated to be present, among the plurality of cleaning target areas, as an updated person-present cleaning target area;

re-identifying, by the processor, cleaning target areas adjacent to the updated person-present cleaning target area as updated surrounding cleaning target areas; and determining, by the processor and among the plurality of cleaning target areas, updated cleaning target areas, for which a cleaning operation has not been performed by the autonomous cleaner, other than the updated person-present cleaning target area and the updated surrounding cleaning target areas, to be updated cleanable areas.

10. The control method according to claim 2, further comprising:

managing, by the processor, cleaning time zone information indicating a predetermined time schedule zone, which specifies a duration of time in which the autonomous cleaner is to perform the cleaning operation; and outputting, when a current time is within the time schedule zone indicated by the cleaning time zone information, the cleaning instruction information.

11. The control method according to claim 10, further comprising:

obtaining, by the processor, cleanable areas for which the cleaning operation was not completed within the time schedule zone indicated in the cleaning time zone information, as incomplete cleaning target areas; and determining, by the processor, among the plurality of cleaning target areas, cleaning target areas including the incomplete cleaning target areas, and other than the person-present cleaning target area and the surrounding cleaning target areas, to be cleanable areas.

12. The control method according to claim 3, further comprising:

determining, by the processor and based on predetermined conditions, one surrounding area information set from a plurality of surrounding area information sets, the plurality of surrounding information sets being included in the surrounding area information; and identifying, by the processor, the surrounding cleaning target areas of the identified person-present cleaning target area based on the one surrounding area information set.

13. The control method according to claim 1, further comprising:

judging, by the processor, whether or not the cleanable areas are shared cleaning target areas, based on related area information correlating predetermined shared cleaning target areas, among the plurality of cleaning target areas, that are used by multiple people at least as passages, and cleaning target areas other than the shared cleaning target areas relating to the shared cleaning target areas;

identifying, by the processor, when the cleanable areas are determined to include the shared cleaning target areas, cleaning target areas correlated with the shared cleaning target areas as being related cleaning target areas, based on the related area information;

judging, by the processor, whether or not the people are present in the identified related cleaning target areas; and determining, by the processor, when people are determined not to be present in the identified related cleaning target areas, the shared cleaning target areas to be the cleanable areas.

14. A control method that controls an autonomous cleaner, the device comprising:

processing circuitry; and a memory storage including at least one set of instructions that, when executed by the processing circuitry, cause the processing circuitry to perform operations including obtaining an electronic floor plan of a predetermined space, the predetermined space being a cleaning range of the autonomous cleaner, estimating a person-present position at which a person is present in the predetermined space, dividing the predetermined space into a plurality of cleaning target areas to be individually cleaned by the autonomous cleaner, identifying a cleaning target area including the person-present position where the person is estimated to be present, among the plurality of cleaning target areas, as a person-present cleaning target area, identifying cleaning target areas adjacent to the person-present cleaning target area as surrounding cleaning target areas, excluding, from the plurality of cleaning target areas, the person-present cleaning target area and the surrounding cleaning target areas from cleaning by the autonomous cleaner, and determining, among the plurality of cleaning target areas, cleaning target areas other than the person-present cleaning target area and the surrounding cleaning target areas to be cleanable areas, wherein at least one unoccupied cleaning target area is present between each of the cleanable areas and the person-present cleaning target area.

15. A non-transitory computer-readable recording medium storing a control program to control an autonomous cleaner, the program, when executed by a computer, causing the computer to execute a method including obtaining an electronic floor plan of a predetermined space, the predetermined space being a cleaning range of the autonomous cleaner, estimating a person-present position at which a person is present in the predetermined space, dividing the predetermined space into a plurality of cleaning target areas to be individually cleaned by the autonomous cleaner, identifying a cleaning target area including the person-present position where the person is estimated to be present, among the plurality of cleaning target areas, as a person-present cleaning target area, identifying cleaning target areas adjacent to the person-present cleaning target area as surrounding cleaning target areas, excluding, from the plurality of cleaning target areas, the person-present cleaning target area and the surrounding cleaning target areas from cleaning by the autonomous cleaner, and determining, among the plurality of cleaning target areas, cleaning target areas other than the person-present cleaning target area and the surrounding cleaning target area to be cleanable areas, wherein at least one unoccupied cleaning target area is present between each of the cleanable areas and the person-present cleaning target area.

16. An autonomous cleaner that cleans while autonomously traveling, comprising:

processing circuitry; and a memory storage including at least one set of instructions that, when executed by the processing circuitry, cause the processing circuitry to perform operations including obtaining an electronic floor plan of a predetermined space, the predetermined space being a cleaning range of the autonomous cleaner, estimating a person-present position at which a person is present in the predetermined space, dividing the predetermined space into a plurality of cleaning target areas to be individually cleaned by the autonomous cleaner, identifying a cleaning target area including the person-present position where the person is estimated to be present, among the plurality of cleaning target areas, as a person-present cleaning target area, identifying cleaning target areas adjacent to the person-present cleaning target area as surrounding cleaning target areas, excluding, from the plurality of cleaning target areas, the person-present cleaning target area and the surrounding cleaning target areas from cleaning by the autonomous cleaner, and determining, among the plurality of cleaning target areas, cleaning target areas other than the person-present cleaning target area and the surrounding cleaning target areas to be cleanable areas, and moving to the cleanable area and performing a cleaning operation in the cleanable area, wherein at least one unoccupied cleaning target area is present between each of the cleanable areas and the person-present cleaning target area.

* * * * *